US011296617B2

United States Patent
Shimada et al.

(10) Patent No.: US 11,296,617 B2
(45) Date of Patent: Apr. 5, 2022

(54) INVERTER CONTROL DEVICE

(71) Applicant: AISIN CORPORATION, Kariya (JP)

(72) Inventors: Arinori Shimada, Nishio (JP); Subrata Saha, Anjo (JP); Motohiro Nakashima, Togo (JP)

(73) Assignee: AISIN CORPORATION, Kariya (JP)

( * ) Notice: Subject to any disclaimer, the term of this patent is extended or adjusted under 35 U.S.C. 154(b) by 127 days.

(21) Appl. No.: 16/639,373

(22) PCT Filed: Sep. 27, 2018

(86) PCT No.: PCT/JP2018/036046
§ 371 (c)(1),
(2) Date: Feb. 14, 2020

(87) PCT Pub. No.: WO2019/065882
PCT Pub. Date: Apr. 4, 2019

(65) Prior Publication Data
US 2020/0259425 A1   Aug. 13, 2020

(30) Foreign Application Priority Data

Sep. 28, 2017 (JP) .............................. JP2017-188338
Sep. 28, 2017 (JP) .............................. JP2017-188339

(51) Int. Cl.
*H02M 7/5387* (2007.01)
*B60L 3/00* (2019.01)
(Continued)

(52) U.S. Cl.
CPC ....... *H02M 7/53871* (2013.01); *B60L 3/0061* (2013.01); *B60L 3/04* (2013.01);
(Continued)

(58) Field of Classification Search
CPC ........... H02M 7/5387; H02M 7/53871; H02M 7/53873; H02M 1/32; H02M 1/322;
(Continued)

(56) References Cited

U.S. PATENT DOCUMENTS 10,840,845 B2 * 11/2020 Sato ...................... B60K 6/387
10,886,867 B2 *  1/2021 Saha ........................ H02P 3/22
(Continued)

FOREIGN PATENT DOCUMENTS

| JP | 2015-198463 A | 11/2015 |
|----|---------------|---------|
| WO | 2012/105266 A1 | 8/2012 |
| WO | 2016/136815 A1 | 9/2016 |

OTHER PUBLICATIONS

Jan. 8, 2019 Search Report issued in International Patent ApplicationNo. PCT/JP2018/036046.

*Primary Examiner* — Adolf D Berhane
(74) *Attorney, Agent, or Firm* — Oliff PLC

(57) ABSTRACT

An inverter control device that includes an electronic control unit that is configured to perform full active short circuit control when the contactors are in an open state and the rotating electrical machine is in a rotating state, the full active short circuit control bringing an upper-stage-side switching element and a lower-stage-side switching element for at least one phase among switching elements for a plurality of phases in the inverter into an on state to allow current to flow back between the rotating electrical machine and the inverter.

20 Claims, 15 Drawing Sheets

(51) Int. Cl.
*B60L 3/04* (2006.01)
*H02P 3/22* (2006.01)
*H02P 27/06* (2006.01)
*H02M 1/32* (2007.01)

(52) U.S. Cl.
CPC ............... *H02P 3/22* (2013.01); *H02P 27/06* (2013.01); *H02M 1/322* (2021.05)

(58) Field of Classification Search
CPC ........ B60L 3/0023; B60L 3/0061; H02P 3/18; H02P 3/22; H02P 27/06; H02P 27/08; H02P 27/085
See application file for complete search history.

(56) References Cited

U.S. PATENT DOCUMENTS

| | | | |
|---|---|---|---|
| 10,978,983 B2* | 4/2021 | Takenaka | H02M 1/12 |
| 11,056,984 B2* | 7/2021 | Miyazaki | H02P 21/36 |
| 11,114,949 B2* | 9/2021 | Mutsuura | H02M 7/48 |
| 2013/0026968 A1 | 1/2013 | Tagome et al. | |
| 2018/0236874 A1 | 8/2018 | Tsukada et al. | |
| 2021/0104956 A1* | 4/2021 | Yamaguchi | B60L 50/51 |

* cited by examiner

INVERTER CONTROL DEVICE

BACKGROUND

The present disclosure relates to an inverter control device that controls an inverter.

JP 2015-198463 A discloses an inverter control device (20) that is connected to a direct-current power supply (11) through contactors (9) and controls an inverter (10) connected to an alternating-current rotating electrical machine (80) to convert electric power between direct current and alternating current of a plurality of phases (the reference signs shown in parentheses in BACKGROUND are those in the literature referred to). When the inverter control device (20) stops the operation of the inverter (10) in a state in which the contactors (9) are in an open state, first, the inverter control device (20) performs charge/discharge control (Phase1). Here, the charge/discharge control is control that repeats a capacitor charge mode in which a capacitor (4) connected to a direct-current side of the inverter (10) is charged and a capacitor discharge mode in which the capacitor (4) is discharged.

When a condition for terminating the charge/discharge control (e.g., a voltage between terminals of the capacitor (4) exceeds an upper limit voltage for charge/discharge.) holds true, next, the inverter control device (20) performs mixed-loop control (Phase21). Here, the mixed-loop control is control in which the inverter (10) is controlled such that current flowing through the inverter (10) forms one each of a state of forming a capacitor charge loop and a state of forming a flow-back loop. Note that the capacitor charge loop is a current loop in which current flows so as to charge the capacitor (4), and the flow-back loop is a current loop in which current flows back between the rotating electrical machine (80) and the inverter (10).

In the capacitor charge loop, the capacitor (4) is charged, and thus, the voltage between the terminals of the capacitor (4) (a voltage on the direct-current side of the inverter (10)) increases. However, when emission of energy from stator coils (8) is stopped, there is no more current flowing through this loop, and the increase in the voltage between the terminals of the capacitor (4) is also stopped. That is, the capacitor charge loop is canceled and only the flow-back loop continues (Phase22). The inverter control device (20) thereafter performs shutdown control in which all switching elements (3) of the inverter (20) are brought into an off state, at timing at which the current in the flow-back loop reaches zero.

Meanwhile, when a counter-electromotive voltage generated by rotation of the rotating electrical machine (80) is higher than a voltage on the direct-current side of the inverter (10), a capacitor charge loop is formed and thus it is not desirable to perform shutdown control. When the rotational speed of the rotating electrical machine (80) is high, the counter-electromotive voltage also increases, and thus, as exemplified in FIG. 11 of this bulletin, too, in an operating region (R2) with a relatively high rotational speed, active short circuit control in which a flow-back loop is formed is selected. However, in the active short circuit control, large current continuously flows through the inverter (10), and thus, heat generation by the current may increase.

Namely, in a situation in which the inverter (10) is stopped, when the rotating electrical machine (80) is rotating at a relatively high rotational speed, it is difficult to stop the inverter (10) by performing charge/discharge control and mixed-loop control and transitioning to shutdown control as described above. In addition, even if a transition to shutdown control is made after performing active short circuit control, as described above, a heating value by current may increase.

SUMMARY

In view of the above-described background, it is desired to provide a technique for controlling an inverter so as to appropriately stop the operation of the inverter when contactors are in an open state and a rotating electrical machine is in a rotating state.

In one aspect, an inverter control device in view of the above description is an inverter control device including: an inverter that is connected to a direct-current power supply through contactors and connected to an alternating-current rotating electrical machine to convert electric power between direct current and alternating current of a plurality of phases; a smoothing capacitor that is disposed between the contactors and the inverter to smooth a direct-current link voltage, the direct-current link voltage being a voltage on a direct-current side of the inverter; and an electronic control unit that is configured to perform full active short circuit control when the contactors are in an open state and the rotating electrical machine is in a rotating state, the full active short circuit control bringing an upper-stage-side switching element and a lower-stage-side switching element for at least one phase among switching elements for a plurality of phases in the inverter into an on state to allow current to flow back between the rotating electrical machine and the inverter.

In an open state of the contactors, energy of stator coils of the rotating electrical machine cannot be regenerated in the direct-current power supply, and the smoothing capacitor connected to the direct-current side of the inverter is charged, which may increase the direct-current link voltage. Hence, it is known to perform active short circuit control in which current is allowed to flow back between the rotating electrical machine and the inverter to inhibit the smoothing capacitor from being charged. In general, in the active short circuit control in which current is allowed to flow back between the rotating electrical machine and the inverter, the inverter is controlled such that one side, all upper-stage-side switching elements or all lower-stage-side switching elements of the inverter, is brought into an on state and the other side is brought into an off state. That is, flow-back current flows through only either one of the upper-stage-side switching elements and the lower-stage-side switching elements. According to this configuration, flow-back current flows through both of an upper-stage-side switching element and a lower-stage-side switching element for at least one phase. For other phases, in general, in the inverter, flow-back current flows by passing through a freewheeling diode connected in parallel to a switching element. The flow-back current flowing through each phase is equal to that for a case of general active short circuit control. For the phase in which flow-back current flows through both the upper-stage-side switching element and the lower-stage-side switching element, the flow-back current flows through the upper-stage-side switching element and the lower-stage-side switching element in a distributed manner, and thus, the current flowing through each switching element decreases, suppressing an increase in temperature. Therefore, according to this configuration, when the contactors are in an open state and the rotating electrical machine is in a rotating state, the inverter can be controlled so as to appropriately stop the operation of the inverter.

Further features and advantages of the inverter control device will become apparent from the following description of an embodiment which will be described with reference to drawings.

DETAILED DESCRIPTION OF EMBODIMENTS

Figure 1:
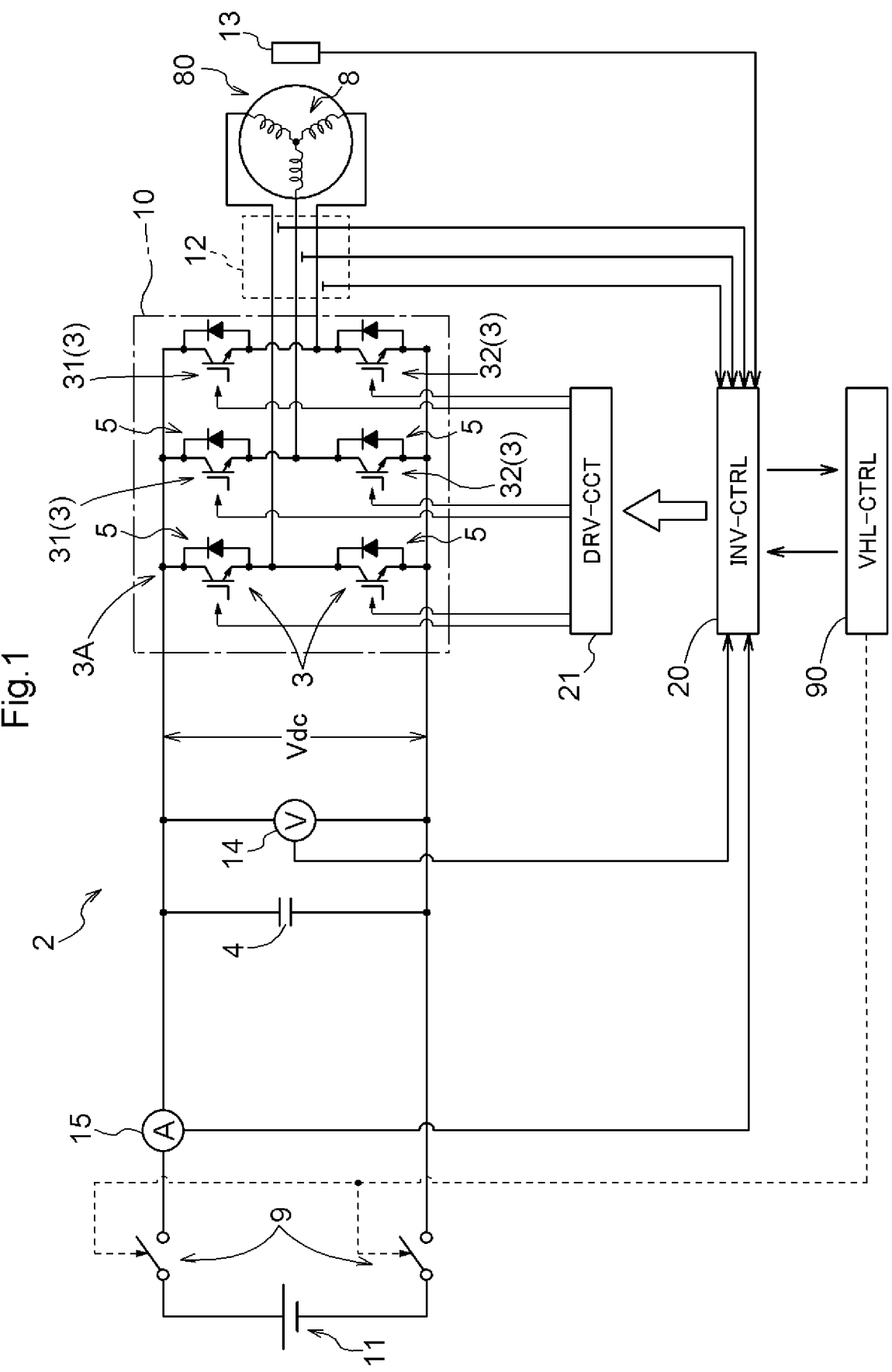
FIG. 1 is a block diagram schematically showing a system configuration including an inverter control device.

An embodiment of an inverter control device will be described below based on the drawings. An inverter control device 20 (INV-CTRL) controls, as shown in FIG. 1, the drive of a rotating electrical machine 80 through an inverter 10. In the present embodiment, a rotating electrical machine driving device 2 is configured to include the inverter 10 and a direct-current link capacitor 4 (smoothing capacitor) which will be described later, and it can also be said that the inverter control device 20 controls the drive of the rotating electrical machine 80 through the rotating electrical machine driving device 2. The rotating electrical machine 80 to be driven is, for example, a rotating electrical machine that serves as a drive power source for a vehicle such as a hybrid vehicle or an electric vehicle. The rotating electrical machine 80 serving as a drive power source for a vehicle is a rotating electrical machine that operates by alternating current of a plurality of phases (here, three-phase alternating currents), and can function as both an electric motor and a generator.

On the vehicle there is mounted a secondary battery (battery) such as a nickel-hydrogen battery or a lithium-ion battery, or a direct-current power supply such as an electric double-layer capacitor, as an electric power source for driving the rotating electrical machine 80. In the present embodiment, as a high-voltage, high-capacity direct-current power supply for supplying electric power to the rotating electrical machine 80, for example, a high-voltage battery 11 (direct-current power supply) with a power supply voltage of 200 to 400 [V] is provided. The rotating electrical machine 80 is an alternating-current rotating electrical machine, and thus, the inverter 10 that converts electric power between direct current and alternating current (here, three-phase alternating currents) is provided between the high-voltage battery 11 and the rotating electrical machine 80. The high-voltage battery 11 can supply electric power to the rotating electrical machine 80 through the inverter 10, and can store electric power generated and obtained by the rotating electrical machine 80.

The smoothing capacitor (direct-current link capacitor 4) that smooths a voltage between the positive and negative polarities on a direct-current side of the inverter 10 (direct-current link voltage Vdc) is provided between the inverter 10 and the high-voltage battery 11. The direct-current link capacitor 4 stabilizes the direct-current link voltage Vdc that fluctuates according to fluctuations in the power consumption of the rotating electrical machine 80.

Between the direct-current link capacitor 4 and the high-voltage battery 11 there are provided contactors 9 that can cut off an electrical connection between circuits on an inverter 10 side that include the direct-current link capacitor 4, and the high-voltage battery 11. In the present embodiment, the contactors 9 are mechanical relays that open and close based on an instruction from a vehicle electric control unit (vehicle electronic control unit (ECU)) 90 which is one of the highest-level control devices of the vehicle, and are referred to as, for example, system main relays (SMRs). When a vehicle's ignition switch or main switch is in an on state (effective state), contacts of the SMRs are closed and the contactors 9 go into a conduction state (connected state), and when the ignition switch or the main switch is in an off state (ineffective state), the contacts of the SMRs are opened and the contactors 9 go into a non-conduction state (open state).

The inverter 10 is configured to include a plurality of switching elements 3. For the switching elements 3, it is preferred to apply power semiconductor devices that can operate at high frequencies, such as insulated gate bipolar transistors (IGBTs), power metal oxide semiconductor field effect transistors (MOSFETs), silicon carbide-metal oxide semiconductor FETs (SiC-MOSFETs), SiC-static induction transistors (SiC-SITs), and gallium nitride-MOSFETs (GaN-MOSFETs). As shown in FIG. 1, the present embodiment exemplifies IGBTs as the switching elements 3.

The inverter 10 includes, as is well known, a bridge circuit including arms 3A whose number matches the number of a plurality of phases (here, three phases). That is, as shown in FIG. 1, one arm 3A is formed by connecting two switching elements 3 (an upper-stage-side switching element 31 and a lower-stage-side switching element 32) in series between the direct-current positive polarity side and direct-current negative polarity side of the inverter 10. In a case of three-phase alternating currents, three (three phases) series circuits (one arm 3A) are connected in parallel to each other. That is, one series circuit (arm 3A) corresponds to each of stator coils 8 for the U-, V-, and W-phases of the rotating electrical machine 80. A freewheeling diode 5 is provided in parallel to each switching element 3, with a direction going from the negative polarity to the positive polarity (a direction going from a lower-stage side to an upper-stage side) being a forward direction.

The inverter control device 20 that performs switching control of each switching element 3 of the inverter 10 is constructed using a logic circuit such as a microcomputer as a core member. For example, the inverter control device 20 controls the rotating electrical machine 80 through the inverter 10 by performing current feedback control using a vector control method, based on target torque of the rotating electrical machine 80 which is provided from another control device, etc., such as the vehicle ECU 90.

Actual currents flowing through the stator coils 8 for the respective phases of the rotating electrical machine 80 are detected by a current sensor 12, and the inverter control device 20 obtains results of the detection. In addition, a magnetic pole position at each time point of a rotor of the rotating electrical machine 80 is detected by a rotation sensor 13, e.g., a resolver, and the inverter control device 20 obtains results of the detection. The inverter control device 20 performs current feedback control using the results of detection obtained by the current sensor 12 and the rotation sensor 13. The inverter control device 20 is configured to include various functional parts for current feedback control, and each functional part is implemented by coordination of hardware such as a microcomputer and software (program).

The power supply voltage of the vehicle ECU 90, the inverter control device 20, etc., is, for example, 5 [V] or 3.3 [V]. On the vehicle there is mounted not only the high-voltage battery 11, but also a low-voltage battery (not shown) which is a power supply isolated from the high-voltage battery 11 and having a lower voltage than the high-voltage battery 11. The power supply voltage of the low-voltage battery is, for example, 12 to 24 [V]. The low-voltage battery supplies electric power to the inverter control device 20 and the vehicle ECU 90 through, for example, a regulator circuit that regulates a voltage.

As shown in FIG. 1, a control terminal of each switching element 3 (e.g., a gate terminal in a case of an IGBT or a FET) included in the inverter 10 is connected to the inverter control device 20 through a drive circuit 21, and switching control of the switching elements 3 is individually performed. A high-voltage system circuit for driving the rotating electrical machine 80 significantly differs in operating voltage (circuit power supply voltage) from a low-voltage system circuit such as the inverter control device 20 that uses a microcomputer, etc., as a core. Hence, the drive circuit 21 (DRV-CCT) is provided that improves driving capabilities (capabilities to allow a circuit at a subsequent stage to operate, e.g., voltage amplitude and output current) of a drive signal (switching control signal) for each switching element 3, and relays the drive signal. The drive circuit 21 is formed using, for example, an insulating element such as a photocoupler or a transformer, or a driver IC.

The inverter control device 20 has two control modes, e.g., pulse width modulation (PWM) control and rectangular-wave control (single-pulse control), as switching pattern modes (modes of voltage waveform control) of the switching elements 3 included in the inverter 10. In addition, the inverter control device 20 has, as stator's field control modes, field regulation control such as normal field control, e.g., maximum torque control in which maximum torque is outputted with respect to motor current and maximum efficiency control in which the motor is driven at maximum efficiency with respect to motor current, field weakening control in which field flux is weakened by allowing a field current (d-axis current Id) that does not contribute to torque to flow or, oppositely, field strengthening control in which field flux is strengthened. The pulse width modulation, the rectangular-wave control (single-pulse control), the normal field control, the field weakening control, the field strengthening control, etc., are publicly known and thus a detailed description thereof is omitted.

As described above, in the present embodiment, the rotating electrical machine 80 is controlled by performing current feedback control using a current vector control method in a two-axis orthogonal vector space (orthogonal vector coordinate system) that rotates in synchronization with the rotation of the rotating electrical machine 80. In the current vector control method, current feedback control is performed, for example, in a two-axis orthogonal vector coordinate system (d-q-axis vector coordinate system) having a d-axis (a field current axis or a field axis) along a direction of field flux generated by a permanent magnet, and a q-axis (a drive current axis or a drive axis) which is electrically advanced by $\pi/2$ relative to the d-axis. The inverter control device 20 determines a torque instruction T* based on target torque of the rotating electrical machine 80 to be controlled, and determines a d-axis current instruction Id* and a q-axis current instruction Iq*.

The inverter control device 20 finds deviations between the current instructions (Id* and Iq*) and actual currents (Iu, Iv, and Iw) flowing through the coils for the respective U-, V-, and W-phases of the rotating electrical machine 80, and performs a proportional-integral control computation (PI control computation) or a proportional-integral-differential control computation (PID control computation), and finally determines three-phase voltage instructions. Based on the voltage instructions, a switching control signal is generated. A mutual coordinate transformation between the actual three-phase coordinate system of the rotating electrical machine 80 and the two-axis orthogonal vector coordinate system is performed based on a magnetic pole position $\theta$ detected by the rotation sensor 13. In addition, a rotational speed $\omega$ (angular velocity or revolutions per minute (rmp)) of the rotating electrical machine 80 is derived from a result of detection obtained by the rotation sensor 13.

Field regulation control is used upon discharge control which will be described later, and thus, a brief description of the field regulation control is added below. Normal field control such as maximum torque control and maximum efficiency control is a control mode using basic current instruction values (a d-axis current instruction Id* and a q-axis current instruction Iq*) which are set based on target torque of the rotating electrical machine 80. On the other hand, field weakening control is a control mode in which of the basic current instruction values, the d-axis current instruction Id* is regulated in order to weaken field flux from the stator. In addition, field strengthening control is a control mode in which of the basic current instruction values, the d-axis current instruction Id* is regulated in order to strengthen field flux from the stator. Upon field weakening control, field strengthening control, etc., the d-axis current Id is thus regulated, but it is also possible to regulate the q-axis current Iq likewise. Upon discharge control which will be described later, by regulating the d-axis current Id and the q-axis current Iq, an armature current (a current corresponding to a vector sum of the d-axis current Id and the q-axis current Iq) is increased.

Meanwhile, when the vehicle's IG switch (main switch) goes into an off state while the rotating electrical machine 80 is being driven, or there is a need to secure vehicle's safety, the contactors 9 are opened (the contacts of the SMRs are opened), and an electrical connection between the high-voltage battery 11 and the circuits on the inverter 10 side that include the direct-current link capacitor 4 is cut off.

When the contactors 9 go into an open state, a stop process for stopping the operation of the inverter 10 is performed by the inverter control device 20. As one control mode of the stop process, shutdown control (SDN) in which all switching elements 3 included in the inverter 10 are brought into an off state may be performed. When shutdown control is performed, current based on energy accumulated in the stator coils 8 flows via the freewheeling diodes 5 and charges the direct-current link capacitor 4. Hence, there is a possibility that a voltage between terminals of the direct-current link capacitor 4 (direct-current link voltage Vdc) suddenly increases in a short period of time. If the capacity and withstand voltage of the direct-current link capacitor 4 are increased to prepare for a possible increase in the direct-current link voltage Vdc, then it leads to an increase in capacitor's physical size. In addition, there is also a need to increase the withstand voltage of the switching elements 3. This hinders miniaturization of the rotating electrical machine driving device 2, and also affects component cost, manufacturing cost, and product cost. In addition, in terms of vehicle safety, too, it is desirable that after stopping the inverter 10, the direct-current link voltage Vdc be lower than a reference value which is set to be a lower voltage than the power supply voltage of the high-voltage battery 11.

Hence, the inverter control device 20 controls each switching element 3 of the inverter 10 so as to stop the operation of the inverter 10 while suppressing an increase in the direct-current link voltage Vdc. Specifically, when the contactors 9 go into an open state, the inverter control device 20 performs discharge control (DCG) in which the direct-current link capacitor 4 is discharged. Here, discharge control is performed by zero-torque control in which the output torque (motoring torque or regeneration torque) of the rotating electrical machine 80 is brought to almost zero. As will be described later, upon zero-torque control (discharge control), the inverter control device 20 sets a torque instruction T* to zero. By this, the torque of the rotating electrical machine 80 transitions to almost zero.

As described above, open/close control of the contactors 9 is performed by the vehicle ECU 90. Therefore, it is preferred that the vehicle ECU 90 notify the inverter control device 20 of the state of the contactors 9 or of a discharge request (DCG_req) to start discharge control. In addition, prior to performance of control to open the contactors 9, the vehicle ECU 90 may notify the inverter control device 20 of opening of the contactors 9 or of a discharge request in advance. In addition, in another mode, a discharge request may be notified to the inverter control device 20 from a control device other than the vehicle ECU 90. For example, a control device other than the vehicle ECU 90 may notify the vehicle ECU 90 of a request to open the contactors 9 due to an abnormality in the vehicle or other factors, and notify the inverter control device 20 of a discharge request. In addition, the inverter control device 20 may receive a result of detection such as an abnormality in the rotating electrical machine driving device 2 and generate a discharge request by itself, and request the vehicle ECU 90 to open/close the contactors 9.

Note that there is also a case in which the contactors 9 are opened due to an impact to the vehicle, a failure of the SMRs, etc. In such a case, the vehicle ECU 90 having detected the opening of the contactors 9 may notify the inverter control device 20 of a discharge request. For example, when the contactors 9 are opened, current (battery current) to be inputted and outputted to/from the high-voltage battery 11 significantly changes. The inverter control device 20 or other control devices may detect the opening of the contactors 9 based on a result of detection obtained by a direct current sensor 15.

Figure 2:
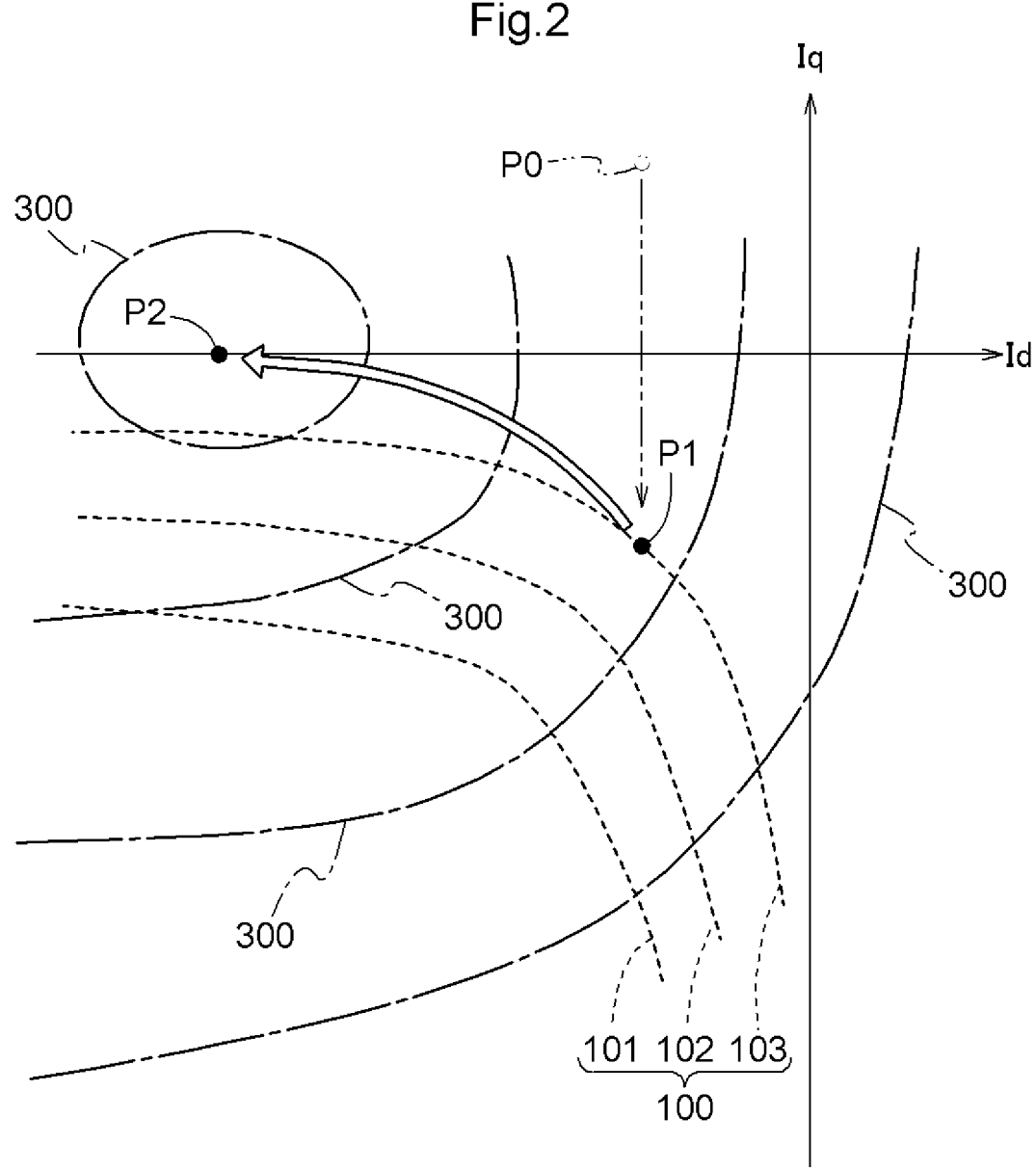
FIG. 2 is a diagram showing operating points of a rotating electrical machine in a current vector coordinate system.

Now, zero-torque control will be described. FIG. 2 schematically shows the operating points (P0, P1, and P2) of the rotating electrical machine 80 in a current vector space (current vector coordinate system). In FIG. 2, reference signs "100" (101 to 103) each indicate an equal torque line representing a vector locus of an armature current at which the rotating electrical machine 80 outputs certain torque. A second equal torque line 102 is lower in torque than a first equal torque line 101, and a third equal torque line 103 is even lower in torque than the second equal torque line 102.

Curves "300" each represent a voltage speed ellipse (voltage limit ellipse). When the counter-electromotive voltage of the rotating electrical machine 80 exceeds the direct-current link voltage Vdc, it becomes impossible to control the rotating electrical machine 80, and thus, a range of current instructions that can be set is limited by a voltage speed ellipse 300 which is a vector locus of an armature current (a vector sum of a d-axis current Id and a q-axis current Iq). In other words, the voltage speed ellipse is a vector locus representing a range of current instructions that can be set based on the value of the direct-current voltage (direct-current link voltage Vdc) of the inverter 10 and the rotational speed ω of the rotating electrical machine 80 that affects the magnitude of the counter-electromotive voltage. That is, the size of the voltage speed ellipse 300 is determined based on the direct-current link voltage Vdc and the rotational speed ω of the rotating electrical machine 80. Specifically, the diameter of the voltage speed ellipse 300 is proportional to the direct-current link voltage Vdc, and is inversely proportional to the rotational speed ω of the rotating electrical machine 80. Current instructions (Id* and Iq*) are set as values at an operating point on an equal torque line 100 present within a voltage speed ellipse 300 in such a current vector coordinate system.

It is assumed that at a point in time when a discharge request is notified to the inverter control device 20, the inverter control device 20 is controlling the rotating electrical machine 80, for example, in torque mode (e.g., PWM control based on target torque) as normal operation. The first operating point P1 shown in FIG. 2 indicates an operating point of the rotating electrical machine 80 in the current vector coordinate system at this point in time. In other words, the rotating electrical machine 80 is performing regeneration operation in torque mode which is normal operation, at the first operating point P1 on the first equal torque line 101. Although here, for convenience sake, a mode in which the rotating electrical machine 80 is performing regeneration operation is exemplified, this may be a mode in which, for example, the rotating electrical machine 80 having performed motoring operation at the operating point P0 represented by an open white circle has transitioned to regeneration operation along with opening of the contactors 9.

When a discharge request is notified, the inverter control device 20 starts zero-torque control in which a torque instruction T* is set so as to bring the torque of the rotating electrical machine 80 to zero, to reduce the q-axis current Iq (drive current) to a zero state, and the d-axis current Id (field current) is increased to increase the armature current, with the torque (=zero) based on the torque instruction T* being maintained. The inverter control device 20 performs control so as to move the operating point from the first operating point P1 to the second operating point P2 as indicated by a block arrow.

Since the contactors 9 are opened, by allowing more armature current than regeneration current to flow, electric charge can be emitted from the direct-current link capacitor 4. Particularly, for the d-axis current Id that does not contribute to torque, it is desirable to allow more d-axis current Id to continue to flow without reducing the amount of the current, to increase loss. Specifically, while the torque is allowed to approach zero by reducing the q-axis current Iq from the first operating point P1, the d-axis current Id is increased. The target second operating point P2 is desirably the center of a voltage speed ellipse. It is preferred that a locus from the first operating point P1 to the second operating point P2 be set based on the coordinates of the first operating point P1, the decrease rate of the q-axis current Iq, and the increase rate of the d-axis current Id, giving priority to a reduction in the q-axis current Iq.

Figure 3:
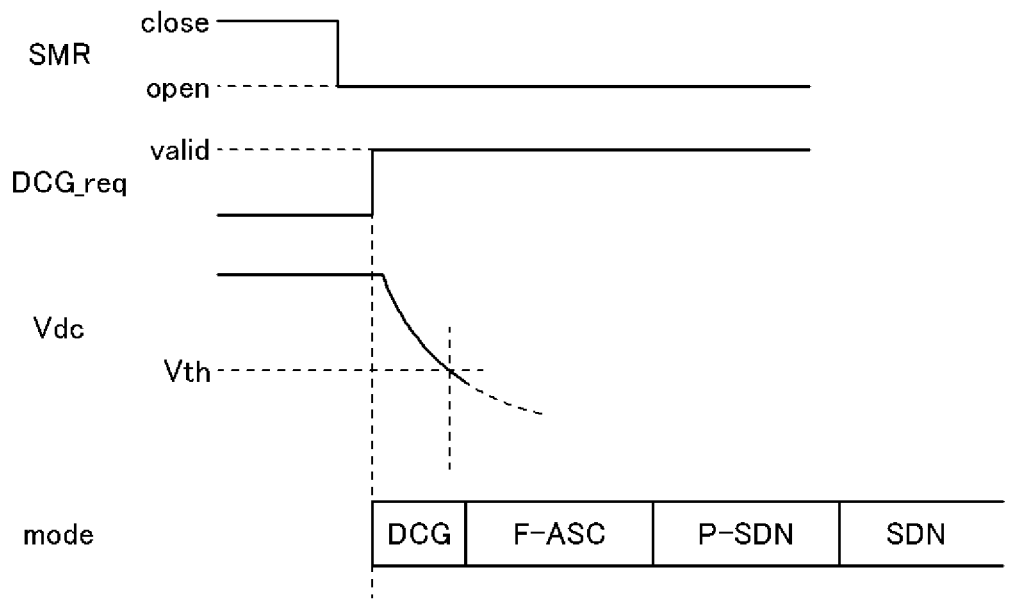
FIG. 3 is a timing chart showing an exemplary transition of control modes.

By allowing an armature current to flow, the direct-current link voltage Vdc equal to the voltage between the terminals of the direct-current link capacitor 4 decreases. As shown in FIG. 3, when the direct-current link voltage Vdc has reached less than or equal to a defined voltage Vth which is defined in advance by discharge control, the inverter control device 20 performs full active short circuit control (F-ASC). The direct-current link voltage Vdc is detected by a voltage sensor 14 and provided to the inverter control device 20. Though details will be described later, the full active short circuit control is control in which of the switching elements 3 for the plurality of phases in the inverter 10, an upper-stage-side switching element 31 and a lower-stage-side switching element 32 for at least one phase are brought into an on state to allow current to flow back between the rotating electrical machine 80 and the inverter 10.

Figure 5:
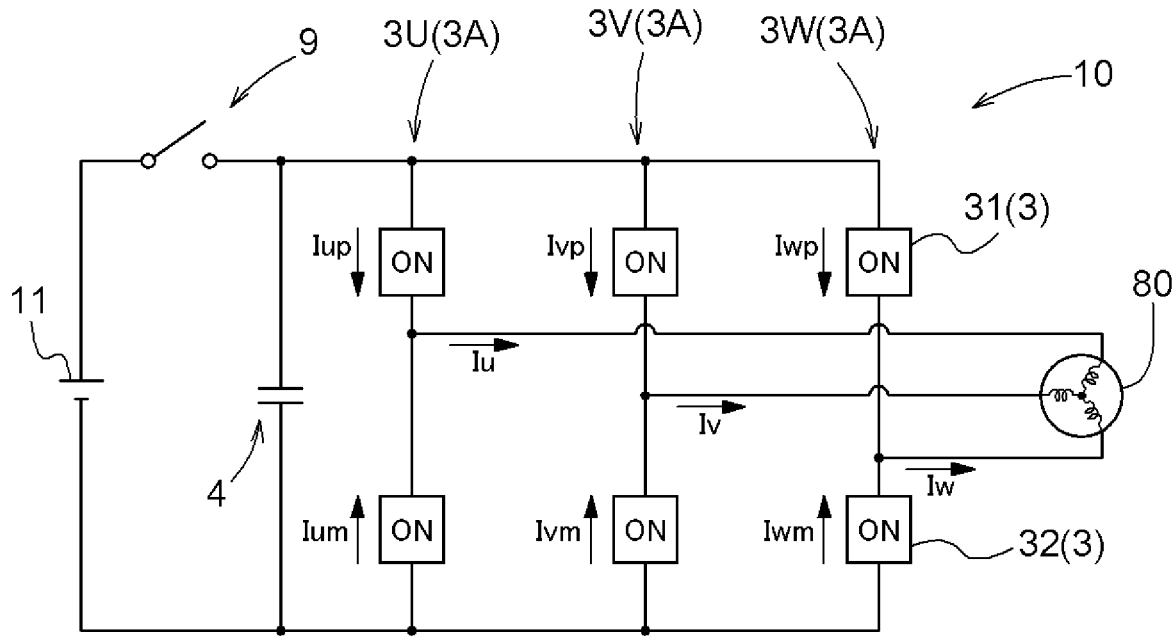
FIG. 5 is a circuit block diagram showing a control state by AF-ASC control.
Figure 15:
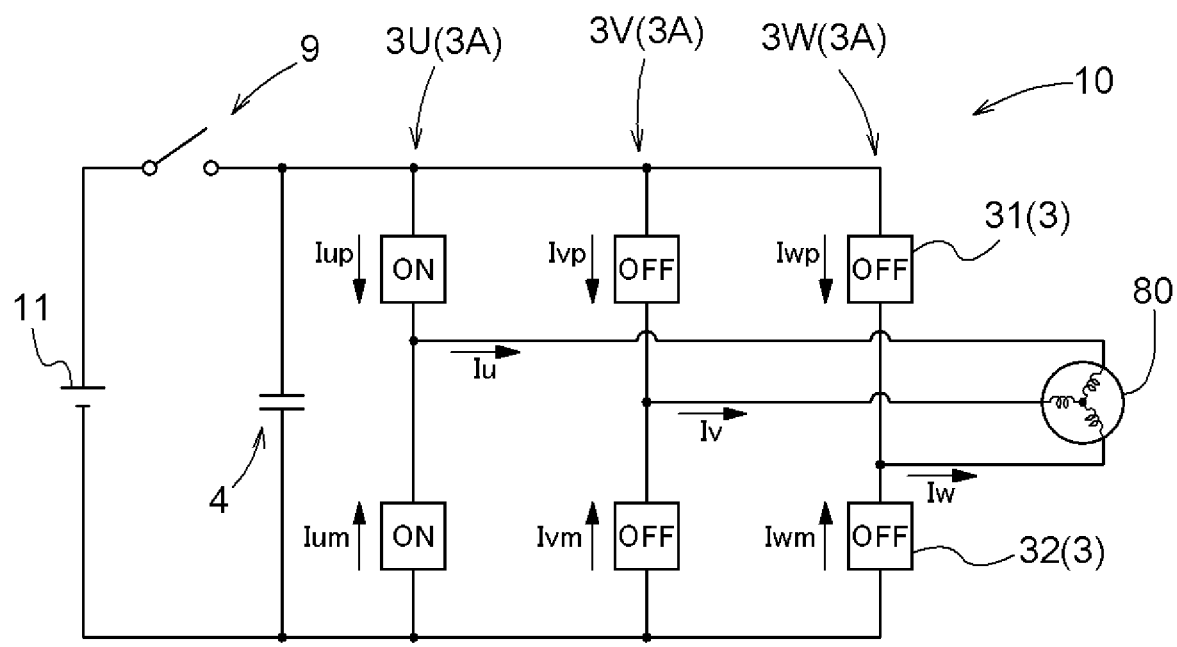
FIG. 15 is a circuit block diagram showing a control state by SF-ASC control.

In the following, as representative examples of full active short circuit control, all-phase full active short circuit control (AF-ASC) and single-phase full active short circuit control (SF-ASC) will be described. As will be described later with reference to FIG. 5, etc., the all-phase full active short circuit control is control in which all switching elements 3 of the inverter 10 are brought into an on state to allow current to flow back between the rotating electrical machine 80 and the inverter 10. In addition, as will be described later with reference to FIG. 15, etc., the single-phase full active short circuit control is control in which of the switching elements 3 for the plurality of phases in the inverter 10, an upper-stage-side switching element 31 and a lower-stage-side switching element 32 for any one phase (target phase) are brought into an on state to allow current to flow back between the rotating electrical machine 80 and the inverter 10. FIG. 15 exemplifies a mode in which an upper-stage-side switching element 31 and a lower-stage-side switching element 32 for the U-phase are brought into an on state.

Note that although a specific depiction and description are omitted in this specification, for example, in a case of the three-phase inverter 10, upper-stage-side switching elements 31 and lower-stage-side switching elements 32 for any two phases may be brought into an on state. Namely, in a case of an n-phase inverter 10, full active short circuit control can be performed by using not only one phase as a target phase, but also a plurality of phases including any one phase to an (n−1) phase as target phases, and bringing upper-stage-side switching elements 31 and lower-stage-side switching elements 32 for the target phases into an on state.

When the direct-current link voltage Vdc is less than or equal to the defined voltage Vth, it is also possible to perform shutdown control in which all switching elements 3 of the inverter 10 are brought into an off state. However, when the rotating electrical machine 80 is rotating, the direct-current link voltage Vdc may increase by a counter-electromotive voltage from the rotating electrical machine 80. Hence, when the rotational speed ω of the rotating electrical machine 80 is higher than a defined rotational speed ωth which is defined in advance, shutdown control is not performed, but full active short circuit control is performed.

Figure 4:
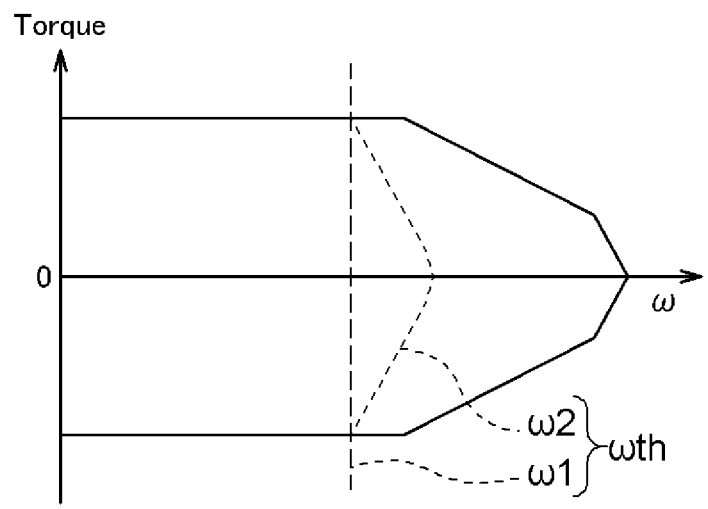
FIG. 4 is a diagram showing an example of a torque map for the rotating electrical machine.

It is preferred that the defined rotational speed ωth be defined, for example, as exemplified in FIG. 4, on a torque map representing a relationship between torque and rotational speed ω. A first defined rotational speed ω1 in FIG. 4 exemplifies a mode in which regardless of torque, a defined rotational speed ωth is set as a constant value. In addition, a second defined rotational speed ω2 in FIG. 4 exemplifies a defined rotational speed ωth whose value varies depending on torque.

As described above, when the direct-current link voltage Vdc has reached less than or equal to the defined voltage Vth by discharge control and the rotational speed ω of the rotating electrical machine 80 is higher than the defined rotational speed ωth which is defined in advance, full active short circuit control is performed. When the rotational speed ω of the rotating electrical machine 80 has thereafter reached less than or equal to the defined rotational speed ωth which is defined in advance, shutdown control is performed, but in the present embodiment, before all switching elements 3 of the inverter 10 are brought into an off state, partial shutdown control (P-SDN) is performed in which of the arms 3A for the plurality of phases (here, three phases) in the inverter 10, switching elements 3 for one or more phases are brought into an off state (see FIG. 6). Then, the inverter control device 20 transitions to shutdown control at timing at which phase currents reach almost zero during the performance of the partial shutdown control (see FIGS. 7, 14, and 18).

Full active short circuit will be described in detail below with reference also to a block diagram showing the controlled state (on/off state) of each switching element 3 of the inverter 10, waveform diagrams of currents flowing through the respective switching elements 3, etc. First, all-phase full active short circuit control will be described, and subsequently, single-phase full active short circuit control will be described.

Figure 7:
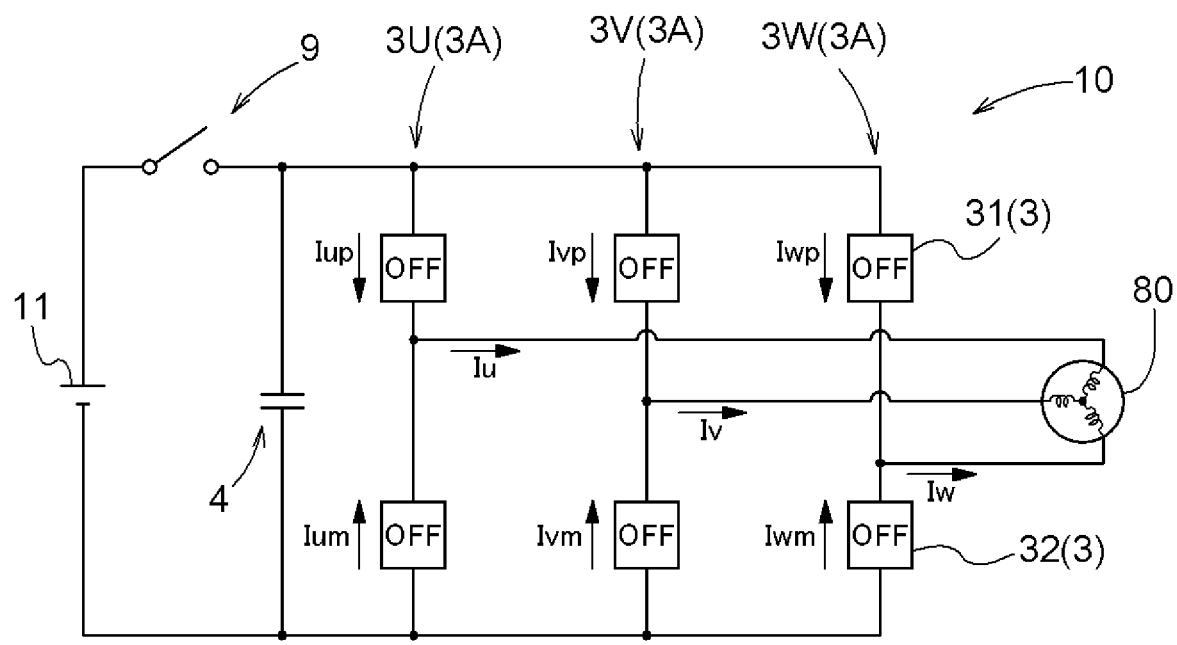
FIG. 7 is a circuit block diagram showing a control state by SDN control.
Figure 8:
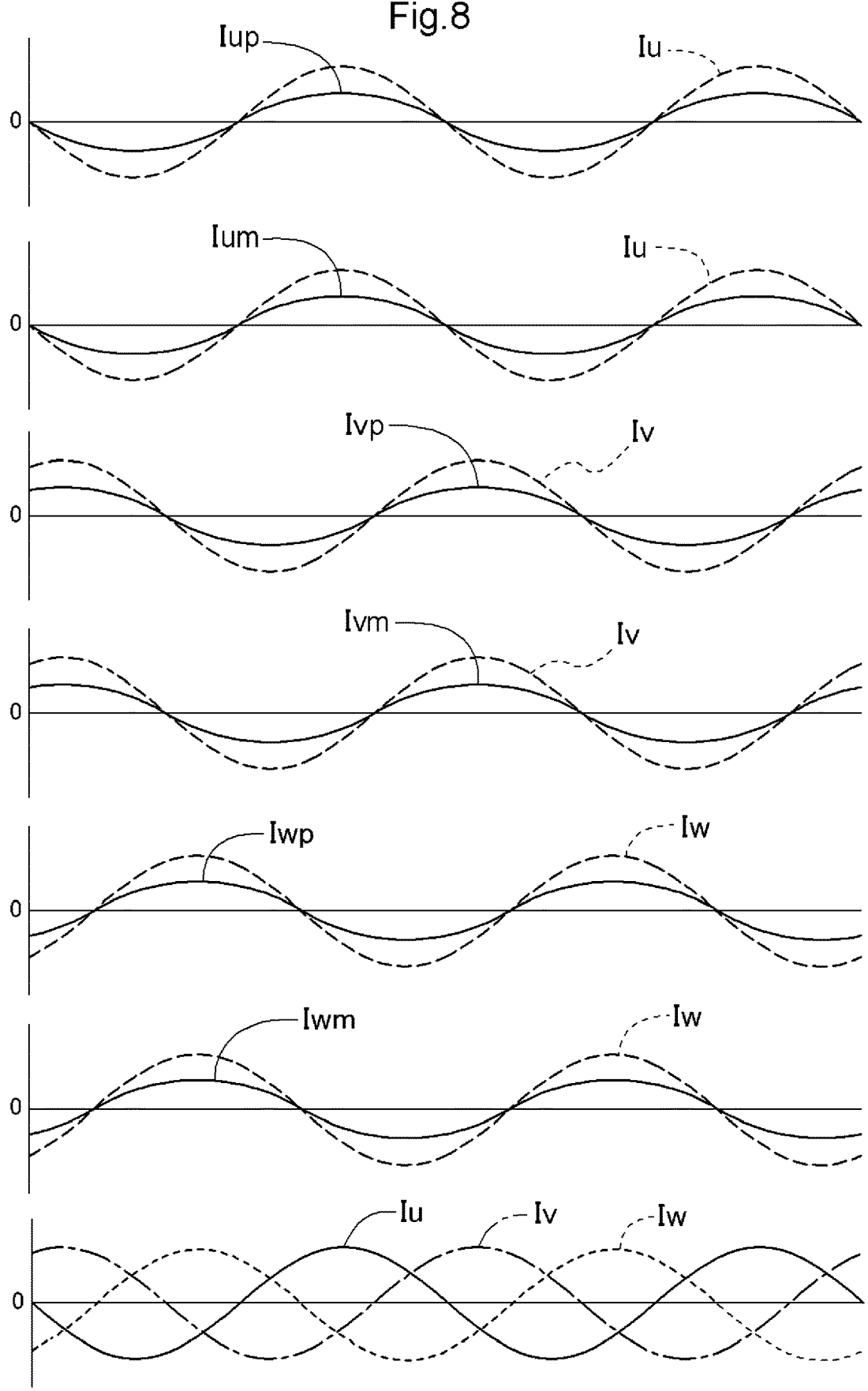
FIG. 8 is waveform diagrams showing an example of current waveforms obtained upon the AF-ASC control.

As described above, FIGS. 5 to 7 schematically show the controlled states (on/off states) of the switching elements 3 of the inverter 10 for when all-phase full active short circuit control, partial shutdown control, and shutdown control are performed, respectively. In addition, FIG. 8 schematically shows currents flowing through the respective switching elements 3 and currents flowing through the stator coils 8 upon the all-phase full active short circuit control shown in FIG. 5. For a current direction, a direction indicated by an arrow in FIG. 5, etc., is a forward direction.

FIG. 8 shows, from the top and by solid lines, a U-phase upper-stage-side current Iup flowing through an upper-stage-side switching element 31 of a U-phase arm 3U, a U-phase lower-stage-side current Ium flowing through a lower-stage-side switching element 32 of the U-phase arm 3U, a V-phase upper-stage-side current Ivp flowing through an upper-stage-side switching element 31 of a V-phase arm 3V, a V-phase lower-stage-side current Ivm flowing through a lower-stage-side switching element 32 of the V-phase arm 3V, a W-phase upper-stage-side current Iwp flowing through an upper-stage-side switching element 31 of a W-phase arm 3W, and a W-phase lower-stage-side current Iwm flowing through a lower-stage-side switching element 32 of the W-phase arm 3W. The bottom of FIG. 8 shows three-phase currents flowing through the stator coils 8. A solid line represents a U-phase current Iu, a dash-dotted line represents a V-phase current Iv, and a dotted line represents a W-phase current Iw. Note that waveforms represented by broken lines in the first to sixth waveform diagrams of FIG. 8 represent the phase currents (Iu, Iv, and Iw) of the respective arms 3A (3U, 3V, and 3W). The broken-line waveforms are the same as waveforms at the bottom of FIG. 8.

Figure 9:
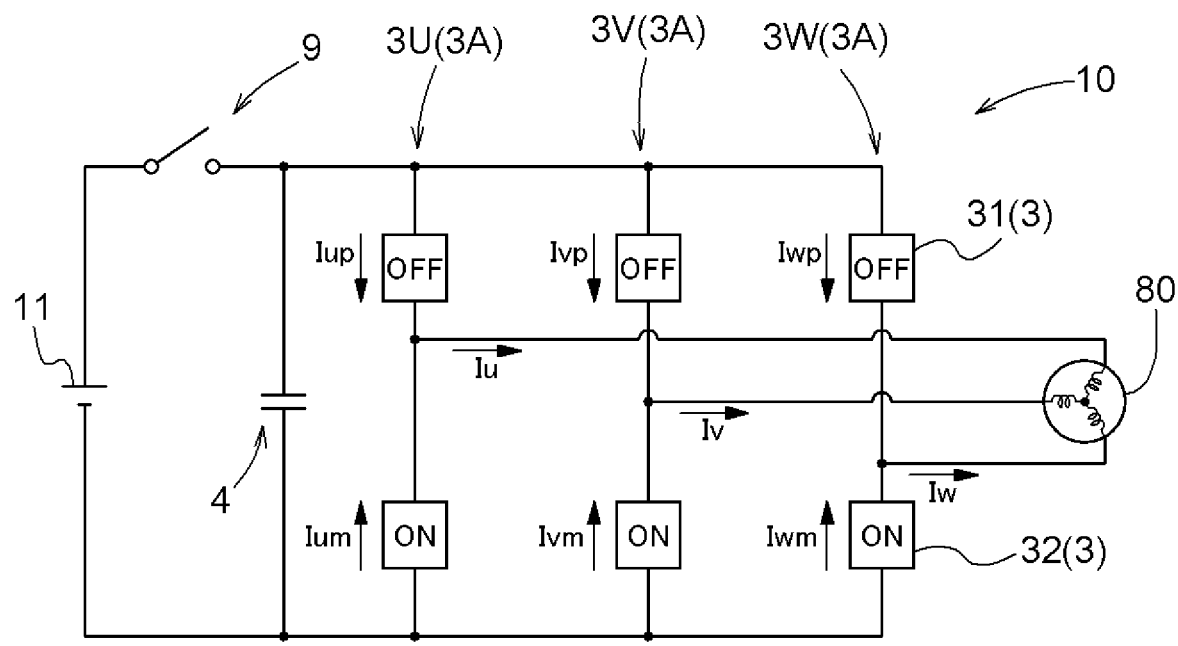
FIG. 9 is a circuit block diagram showing a control state by ASC control, as a comparative example.

Meanwhile, in general, active short circuit control (ASC) is performed as either upper-half active short circuit control in which all upper-stage-side switching elements 31 of the inverter 10 are brought into an on state and all lower-stage-side switching elements 32 are brought into an off state, or lower-half active short circuit control in which all lower-stage-side switching elements 32 of the inverter 10 are brought into an on state and all upper-stage-side switching elements 31 are brought into an off state. FIG. 9 schematically shows the controlled states (on/off states) of the switching elements 3 of the inverter 10 for when lower-half active short circuit control is performed, as a comparative example of the all-phase full active short circuit control of FIG. 5. In addition, FIG. 10 schematically shows, as a comparative example of FIG. 8, currents flowing through the respective switching elements 3 and currents flowing through the stator coils 8 upon the lower-half active short circuit control shown in FIG. 9.

Figure 10:
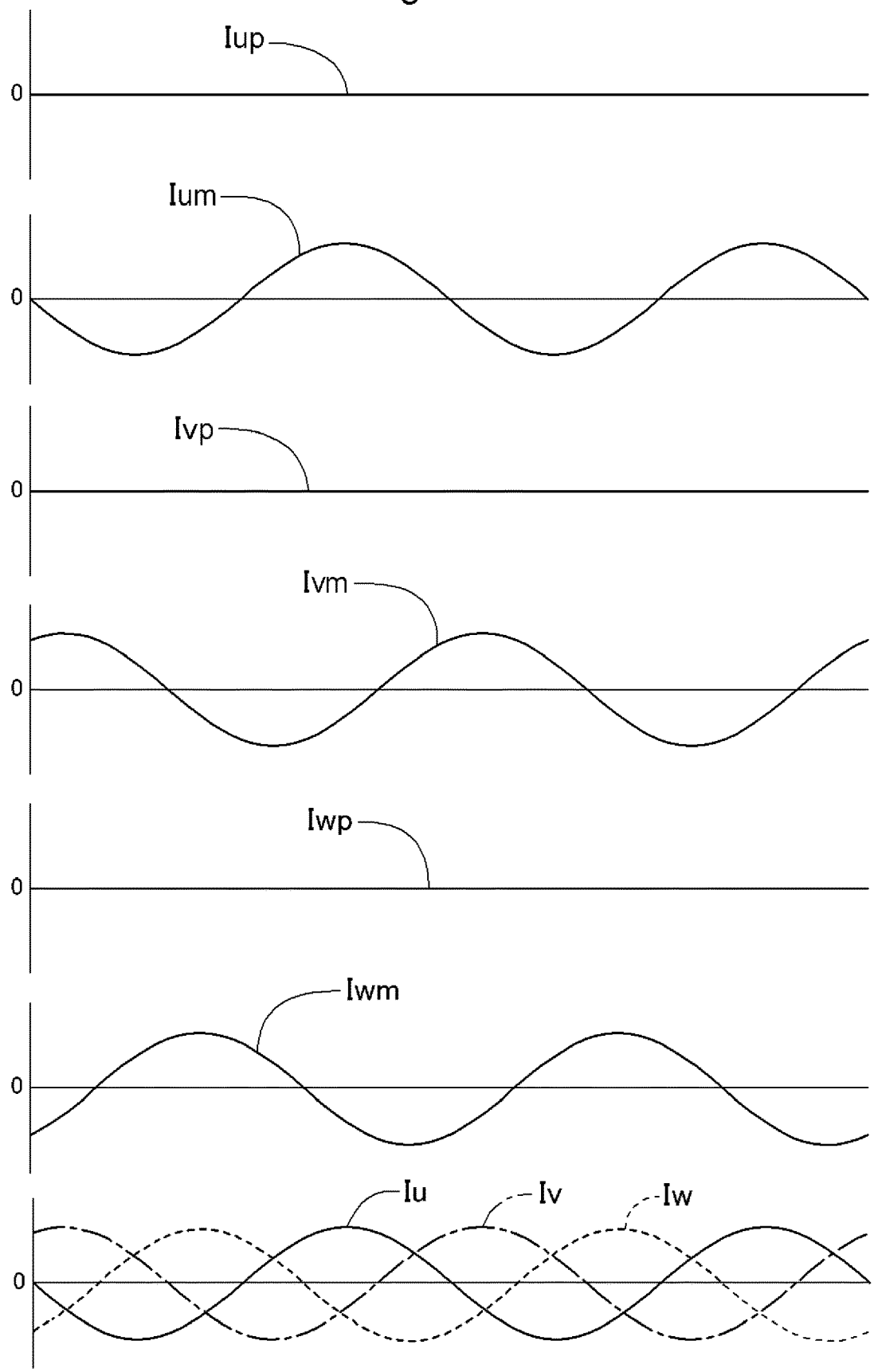
FIG. 10 is waveform diagrams showing an example of current waveforms obtained upon the ASC control, as the comparative example.

The waveforms at the bottom of FIG. 8 are equal to the waveforms at the bottom of FIG. 10. That is, the waveforms of three-phase currents flowing through the stator coils 8 are equal for both of a case in which all-phase full active short circuit control is performed and a case in which lower-half active short circuit control is performed. Note, however, that as shown in FIG. 10, upon lower-half active short circuit control, currents do not flow through the upper-stage-side switching elements 31 that are controlled to an off state. Therefore, current that flows back between the inverter 10 and the rotating electrical machine 80 intensively flows through each lower-stage-side switching element 32, and the lower-stage-side switching elements 32 have a higher heating value compared to the upper-stage-side switching elements 31.

On the other hand, in all-phase full active short circuit control, as shown in FIG. 8, currents flow through both the upper-stage-side switching elements 31 and the lower-stage-side switching elements 32. That is, current that flows back between the inverter 10 and the rotating electrical machine 80 flows through the upper-stage-side switching elements 31 and the lower-stage-side switching elements 32 in a distributed manner. Therefore, the current flowing through the lower-stage-side switching elements 32 is roughly half that for the lower-half active short circuit control of the comparative example. Hence, the heating value of the lower-stage-side switching elements 32 is also smaller than that for the lower-half active short circuit control of the comparative example. Although the heating value of the upper-stage-side switching elements 31 is larger than that of the comparative example, since heat generation does not intensively occur in the lower-stage-side switching elements 32 in the inverter 10, the overall heat resistance of the inverter 10 is higher than that of the comparative example.

Now, with reference also to flowcharts of FIGS. 11, 12, and 13 and a schematic waveform diagram of three-phase currents of FIG. 14, a procedure will be described in which the inverter control device 20 performs an inverter stop process for appropriately stopping the operation of the inverter 10 when the contactors 9 are in an open state and the rotating electrical machine 80 is in a rotating state.

Figure 11:
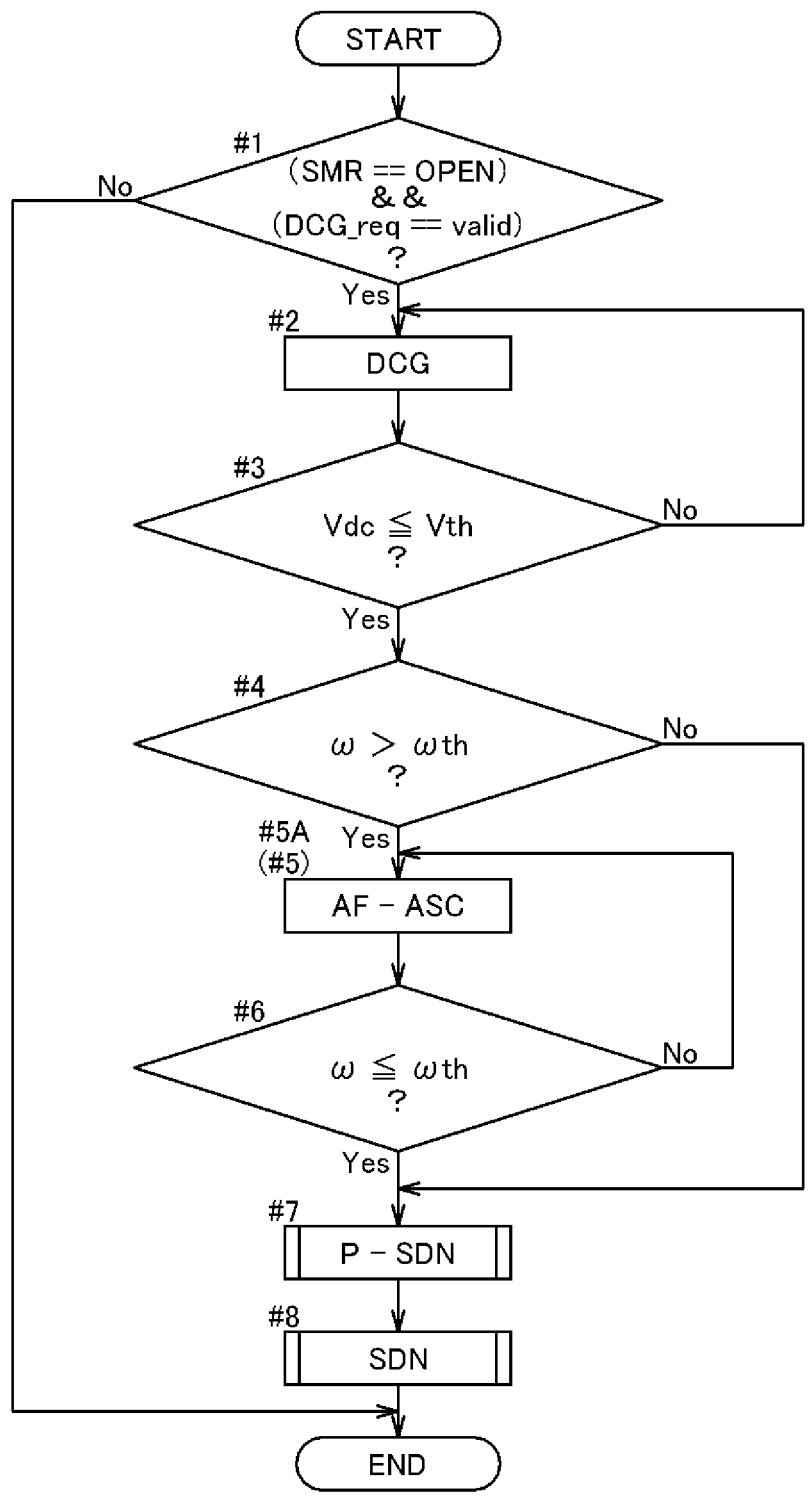
FIG. 11 is a flowchart showing an example of an inverter stop process.

When the contactors 9 (SMRs) are in an open state and a discharge control request (DCG_req) is valid, the inverter control device 20 performs an inverter stop process at step #2 to #9 shown in FIG. 11 (#1). When the contactors 9 (SMRs) are in an open state and a discharge control request (DCG_req) is valid, the inverter control device 20 performs discharge control (DCG) (#2). As described above with reference to FIG. 3, the discharge control continues until the direct-current link voltage Vdc reaches less than or equal to the defined voltage Vth (#3). Though illustration, etc., in the flowchart are omitted, as a matter of course, a determination of the direct-current link voltage Vdc is made before starting discharge control, and when the direct-current link voltage Vdc is less than or equal to the defined voltage Vth, without starting discharge control, processing may transition to the next process.

If the inverter control device 20 determines that the direct-current link voltage Vdc is less than or equal to the defined voltage Vth, then the inverter control device 20 determines whether the rotational speed ω of the rotating electrical machine 80 is higher than the defined rotational speed ωth (#4). When the rotational speed ω is less than or equal to the defined rotational speed ωth, even if the counter-electromotive voltage of the rotating electrical machine 80 is lower than the direct-current link voltage Vdc or higher than the direct-current link voltage Vdc, an increase in the direct-current link voltage Vdc is within an allowable range, and thus, the inverter control device 20 can perform shutdown control of the inverter 10. In the present embodiment, the inverter control device 20 performs partial shutdown control (P-SDN), followed by shutdown control (SDN), and thereby stops the inverter 10 (#7, #8, and #9).

If the inverter control device 20 determines at step #4 that the rotational speed ω of the rotating electrical machine 80 is higher than the defined rotational speed ωth, the inverter control device 20 performs all-phase full active short circuit control (AF-ASC) which is described above with reference to FIGS. 5 and 8 (#5A). That is, if it is determined at step #4 that the rotational speed ω of the rotating electrical machine 80 is higher than the defined rotational speed ωth, full active short circuit control (F-ASC) is performed (#5). When current is allowed to flow back between the rotating electrical machine 80 and the inverter 10, breaking force acts on the rotating electrical machine 80. If the inverter control device 20 determines that the rotational speed ω of the rotating electrical machine 80 has reached less than or equal to the defined rotational speed ωth, the inverter control device 20 performs partial shutdown control (P-SDN) (#6 and #7).

Figure 6:
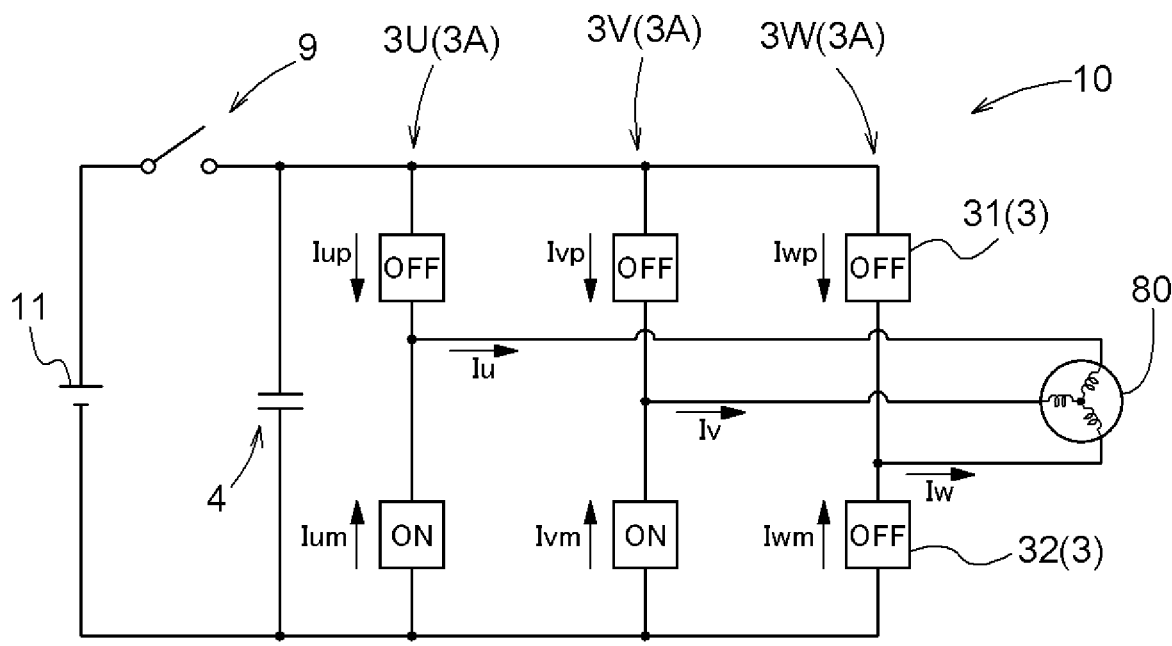
FIG. 6 is a circuit block diagram showing a control state by P-SDN control.
Figure 12:
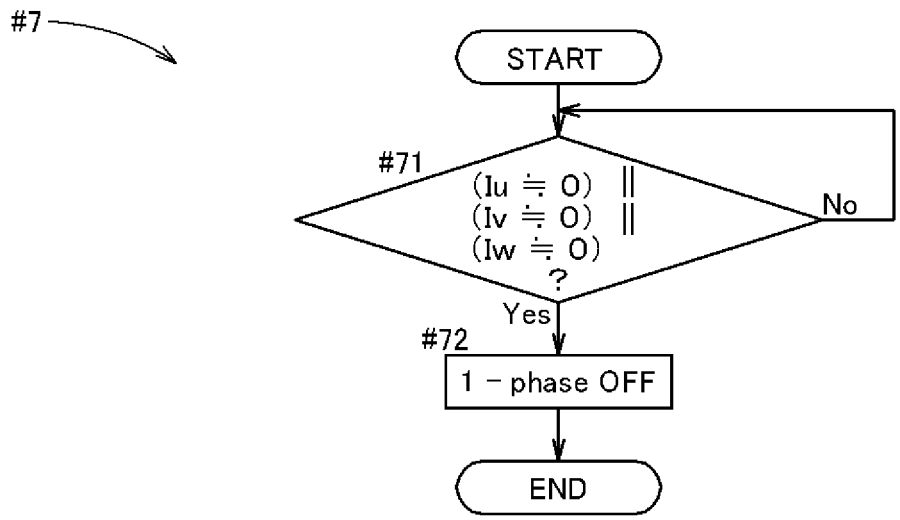
FIG. 12 is a flowchart showing an example of partial shutdown control.
Figure 14:
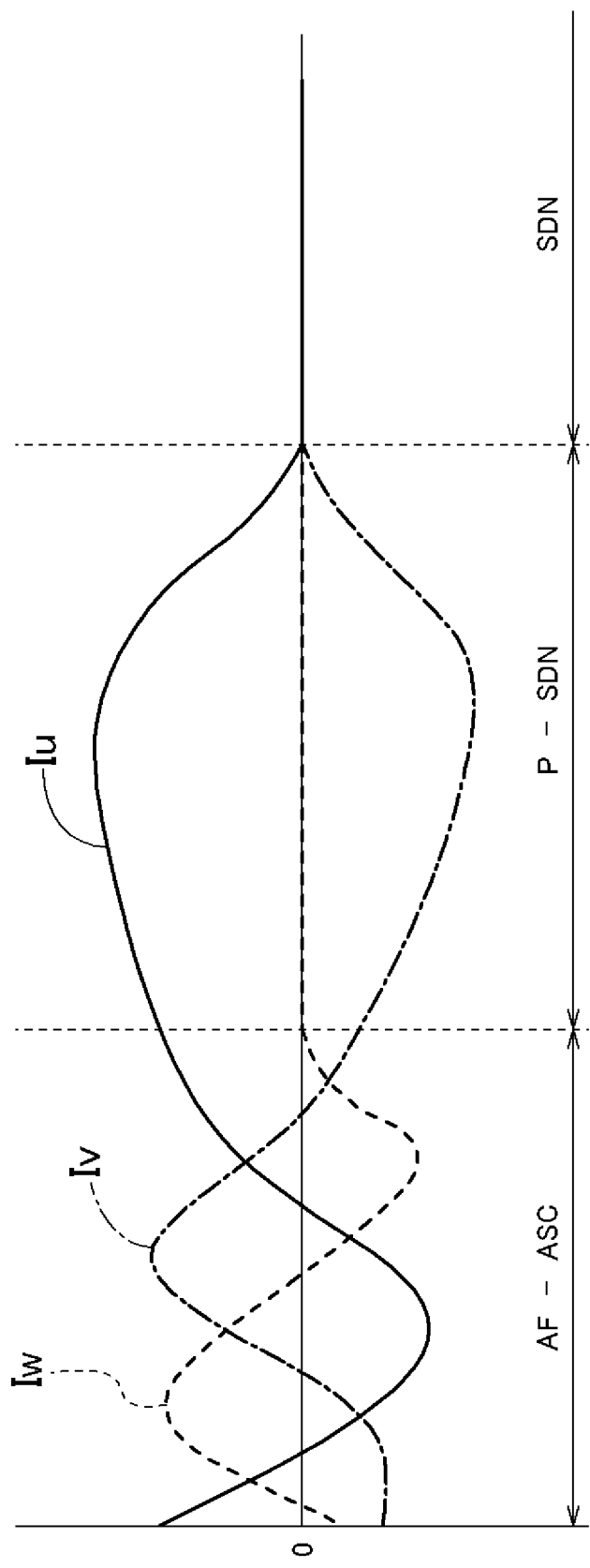
FIG. 14 is a waveform diagram showing an example of three-phase currents in the inverter stop process.

Note that as shown in FIGS. 12 and 14, a transition to partial shutdown control is made at a point in time when any one phase among three-phase alternating currents (Iu, Iv, and Iw) has reached zero (close to zero). That is, it is determined whether any one of the U-phase current Iu, the V-phase current Iv, and the W-phase current Iw is close to zero (#71), and if any one of them is zero, then switching elements 3 on both the upper and lower stages for the one phase with zero are controlled to an off state (#72: 1-phase OFF). In the present embodiment, at a point in time when the W-phase current Iw has reached zero (close to zero), both the upper-stage-side switching element 31 and the lower-stage-side switching element 32 of the W-phase arm 3W are controlled to an off state. Though not shown at step #72, the switching element 3 of either one of an upper-stage-side switching element 31 and a lower-stage-side switching element 32 for each of the remaining two phases, the U-phase arm 3U and the V-phase arm 3V, is also simultaneously controlled to an off state. In the present embodiment, as shown in FIG. 6, upper-stage-side switching elements 31 of the U-phase arm 3U and the V-phase arm 3V are controlled to an off state.

In the partial shutdown control, a partial shutdown state is achieved by bringing at least one of the switching elements 3 included in the inverter 10 into an on state. In other words, by bringing switching elements 3 for one or more phases among the arms 3A for the plurality of phases (n phases: n is a natural number greater than or equal to 2) in the inverter 10 into an off state, one or more and less than n arms 3A are brought into a shutdown state. In the present embodiment, as shown in FIG. 6, switching elements 3 on both the upper and lower stages of the W-phase arm 3W go into an off state, and the W-phase arm 3W goes into a shutdown state. In the U-phase arm 3U and the V-phase arm 3V, their upper-stage-side switching elements 31 go into an off state, and their lower-stage-side switching elements 32 go into an on state, going into a state in which active short circuit control is partially performed. That is, when taking a look at the U-phase and the V-phase, these phases are in a state of being subjected to lower-half partial active short circuit control.

Since the W-phase is in the shutdown state, as shown in FIG. 14, almost no current flows through the W-phase, and current flows through the U-phase and the V-phase in a distributed manner. Since alternating currents are balanced, the U-phase current Iu and the V-phase current Iv pass through an amplitude center (zero) at almost the same timing. In the present embodiment, the W-phase current Iw is already almost zero upon performing partial shutdown control, but the U-phase current Iu and the V-phase current Iv reach almost zero during the performance of the partial shutdown control, and at timing at which phase currents for all three phases have reached almost zero, the inverter control device 20 performs shutdown control (SDN) (#8).

Figure 13:
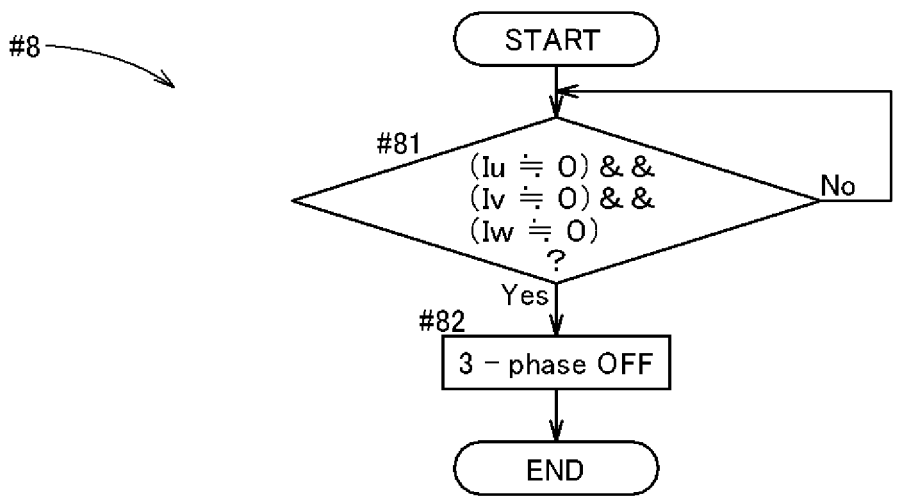
FIG. 13 is a flowchart showing an example of shutdown control.

As shown in FIGS. 13 and 14, a transition to shutdown control is made at a point in time when alternating currents (Iu, Iv, and Iw) for three phases all have reached zero (close to zero). That is, it is determined whether the U-phase current Iu, the V-phase current Iv, and the W-phase current Iw are all close to zero (#81), and when all are zero, all switching elements 3 are controlled to an off state (#82: 3-phase OFF). In the present embodiment, the W-phase current Iw is already zero (close to zero), and thus, when both the U-phase current Iu and the V-phase current Iv have reached zero (close to zero), a condition is satisfied, and the lower-stage-side switching elements 32 of the U-phase arm 3U and the V-phase arm 3V in the on state are controlled to an off state (a transition from a state of FIG. 6 to a state of FIG. 7 is made).

Figure 16:
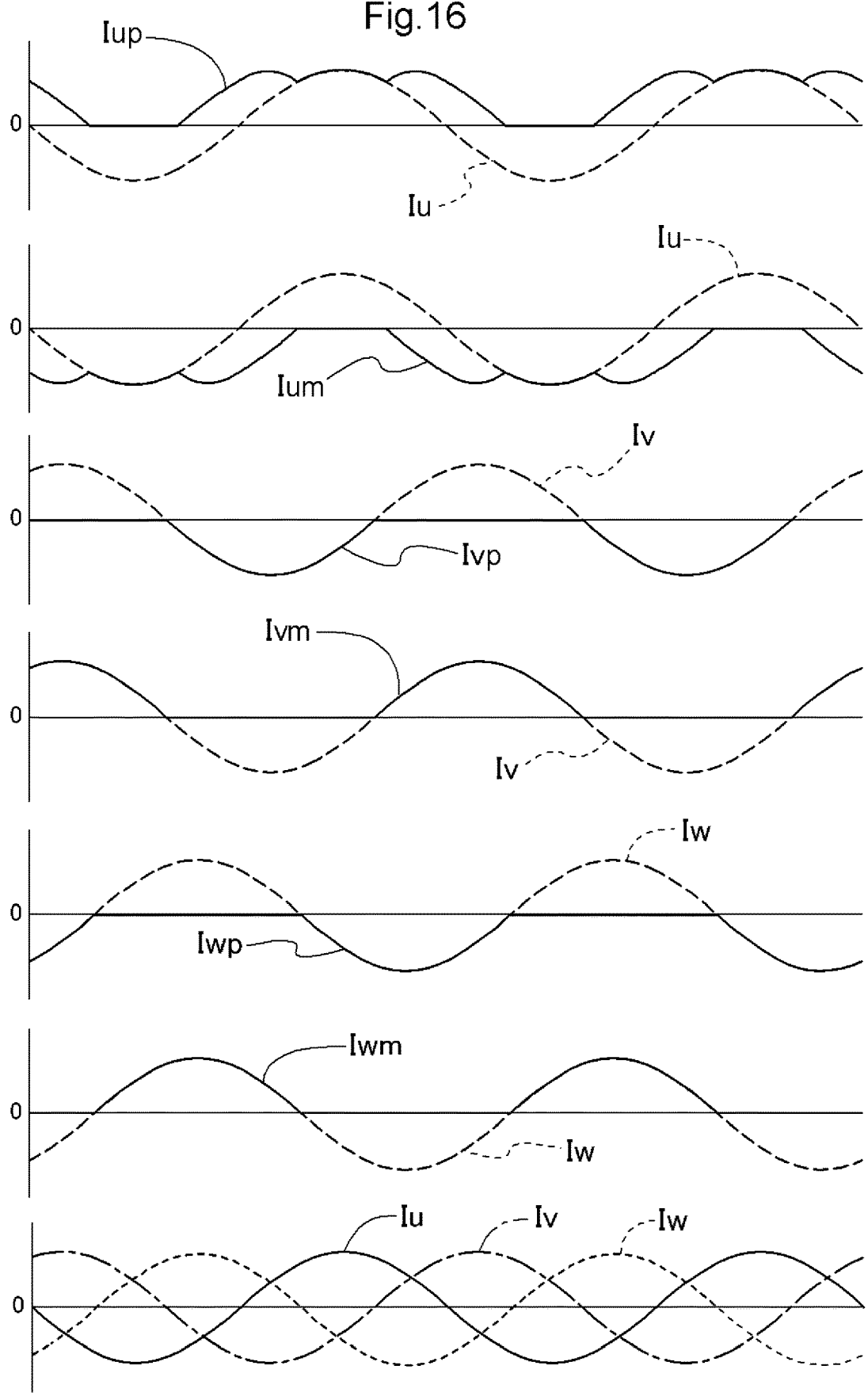
FIG. 16 is waveform diagrams showing an example of current waveforms obtained upon the SF-ASC control.

Next, single-phase full active short circuit control will be described with reference also to a block diagram showing the controlled state (on/off state) of each switching element 3 of the inverter 10, waveform diagrams of currents flowing through the respective switching elements 3, etc. FIG. 15 schematically shows the controlled states (on/off states) of the switching elements 3 of the inverter 10 for when single-phase full active short circuit control is performed. As described above, here, a mode is exemplified in which a target phase is the U-phase, and an upper-stage-side switching element 31 and a lower-stage-side switching element 32 for the U-phase are brought into an on state. Note that the controlled states of the switching elements 3 of the inverter 10 for when partial shutdown control is performed and when shutdown control is performed will be described with reference to FIGS. 6 and 7 again as in the description of all-phase full active short circuit control. Note also that FIG. 16 schematically shows currents flowing through the respective switching elements 3 and currents flowing through the stator coils 8 upon the single-phase full active short circuit control shown in FIG. 15. For a current direction, a direction indicated by an arrow in FIG. 15, etc., is a forward direction.

FIG. 16 shows, from the top and by solid lines, a U-phase upper-stage-side current Iup flowing through the upper-stage-side switching element 31 of the U-phase arm 3U, a U-phase lower-stage-side current Ium flowing through the lower-stage-side switching element 32 of the U-phase arm 3U, a V-phase upper-stage-side current Ivp flowing through the upper-stage-side switching element 31 of the V-phase arm 3V, a V-phase lower-stage-side current Ivm flowing through the lower-stage-side switching element 32 of the V-phase arm 3V, a W-phase upper-stage-side current Iwp flowing through the upper-stage-side switching element 31 of the W-phase arm 3W, and a W-phase lower-stage-side current Iwm flowing through the lower-stage-side switching element 32 of the W-phase arm 3W. The bottom of FIG. 16 shows three-phase currents flowing through the stator coils 8. A solid line represents a U-phase current Iu, a dash-dotted line represents a V-phase current Iv, and a dotted line represents a W-phase current Iw. Note that waveforms represented by broken lines in the first to sixth waveform diagrams of FIG. 16 represent the phase currents (Iu, Iv, and Iw) of the respective arms 3A (3U, 3V, and 3 W). The broken-line waveforms are the same as waveforms at the bottom of FIG. 16.

Meanwhile, in general, active short circuit control (ASC) is performed as either upper-half active short circuit control in which all upper-stage-side switching elements 31 of the inverter 10 are brought into an on state and all lower-stage-side switching elements 32 are brought into an off state, or lower-half active short circuit control in which all lower-stage-side switching elements 32 of the inverter 10 are brought into an on state and all upper-stage-side switching elements 31 are brought into an off state. As described above, FIG. 9 schematically shows the controlled states (on/off states) of the switching elements 3 of the inverter 10 for when lower-half active short circuit control is performed, as a comparative example of the single-phase full active short circuit control of FIG. 15. In addition, as described above, FIG. 10 schematically shows, as a comparative example of FIG. 16, currents flowing through the respective switching elements 3 and currents flowing through the stator coils 8 upon the lower-half active short circuit control shown in FIG. 9.

The waveforms at the bottom of FIG. 16 are equal to the waveforms at the bottom of FIG. 10. That is, the waveforms of three-phase currents flowing through the stator coils 8 are equal for both of a case in which single-phase full active short circuit control is performed and a case in which lower-half active short circuit control is performed. Note that as shown in FIG. 10, upon lower-half active short circuit control, currents do not flow through the upper-stage-side switching elements 31 that are controlled to an off state. Therefore, current that flows back between the inverter 10 and the rotating electrical machine 80 intensively flows through each lower-stage-side switching element 32, and the lower-stage-side switching elements 32 have a higher heating value compared to the upper-stage-side switching elements 31.

On the other hand, in single-phase full active short circuit control, as shown in FIG. 16, for the U-phase, currents flow through both the upper-stage-side switching element 31 and the lower-stage-side switching element 32. For the V-phase and the W-phase, flow-back current flows by passing through a freewheeling diode 5 connected in parallel to a switching element 3. The flow-back current flowing through each phase is equal to that for a case of lower-half active short circuit control. For the U-phase in which flow-back current flows through both the upper-stage-side switching element 31 and the lower-stage-side switching element 32, current that flows back between the inverter 10 and the rotating electrical machine 80 flows through the upper-stage-side switching element 31 and the lower-stage-side switching element 32 in a distributed manner. Therefore, the current flowing through the lower-stage-side switching elements 32 for the U-phase is roughly half that for the lower-half active short circuit control of the comparative example. Hence, the heating value of the lower-stage-side switching element 32 for the U-phase is also smaller than that for the lower-half active short circuit control of the comparative example. Although the heating value of the upper-stage-side switching element 31 for the U-phase is larger than that of the comparative example, since heat generation does not intensively occur in the lower-stage-side switching elements 32 in the inverter 10, the overall heat resistance of the inverter 10 is higher than that of the comparative example.

Meanwhile, it is preferred that the inverter control device 20 allow a phase (target phase) to be subjected to single-phase full active short circuit control to transition from one to another. As described above, in the U-phase which is a target phase, the heating value of the upper-stage-side switching element 31 is larger than that of the comparative example. By allowing the target phase to sequentially transition to the V-phase and the W-phase, the phase in which the heating value is larger than that of the comparative example can be distributed.

Note that it is not single-phase full active short circuit control, but in a case of full active short circuit control in which a plurality of target phases are set, too, it is preferred to allow the target phase to transition. For example, it is preferred to make a transition in turn between a phase in which the U-phase and the V-phase are target phases, a phase in which the V-phase and the W-phase are target phases, and a phase in which the W-phase and the U-phase are target phases.

As described above, a freewheeling diode 5 is connected in parallel to each switching element 3, with a direction going from the direct-current negative polarity to positive polarity being a forward direction. Hence, in other phases than a target phase which is controlled to an on state, too, current in the forward direction of the freewheeling diode 5 flows. However, since current does not flow through a switching element 3 in an off state, a burden placed on switching elements 3 is limited to the target phase. By allowing the target phase to transition from one to another, a burden can be distributed between the switching elements 3 for the respective phases. Particularly, when single-phase full active short circuit control is performed, there is a possibility that load bias becomes remarkable. However, by allowing the target phase to transition from one to another, a load can be prevented from being biased.

Now, with reference also to flowcharts of FIGS. 17, 12, and 13 and a schematic waveform diagram of three-phase currents of FIG. 18, a procedure will be described in which the inverter control device 20 performs an inverter stop process for appropriately stopping the operation of the inverter 10 when the contactors 9 are in an open state and the rotating electrical machine 80 is in a rotating state. The flowchart showing an example of partial shutdown control shown in FIG. 12 and the flowchart showing an example of shutdown control shown in FIG. 13 have been referred to in the description of all-phase full active short circuit, but are also referred to again in the following description of single-phase full active short circuit.

Figure 17:
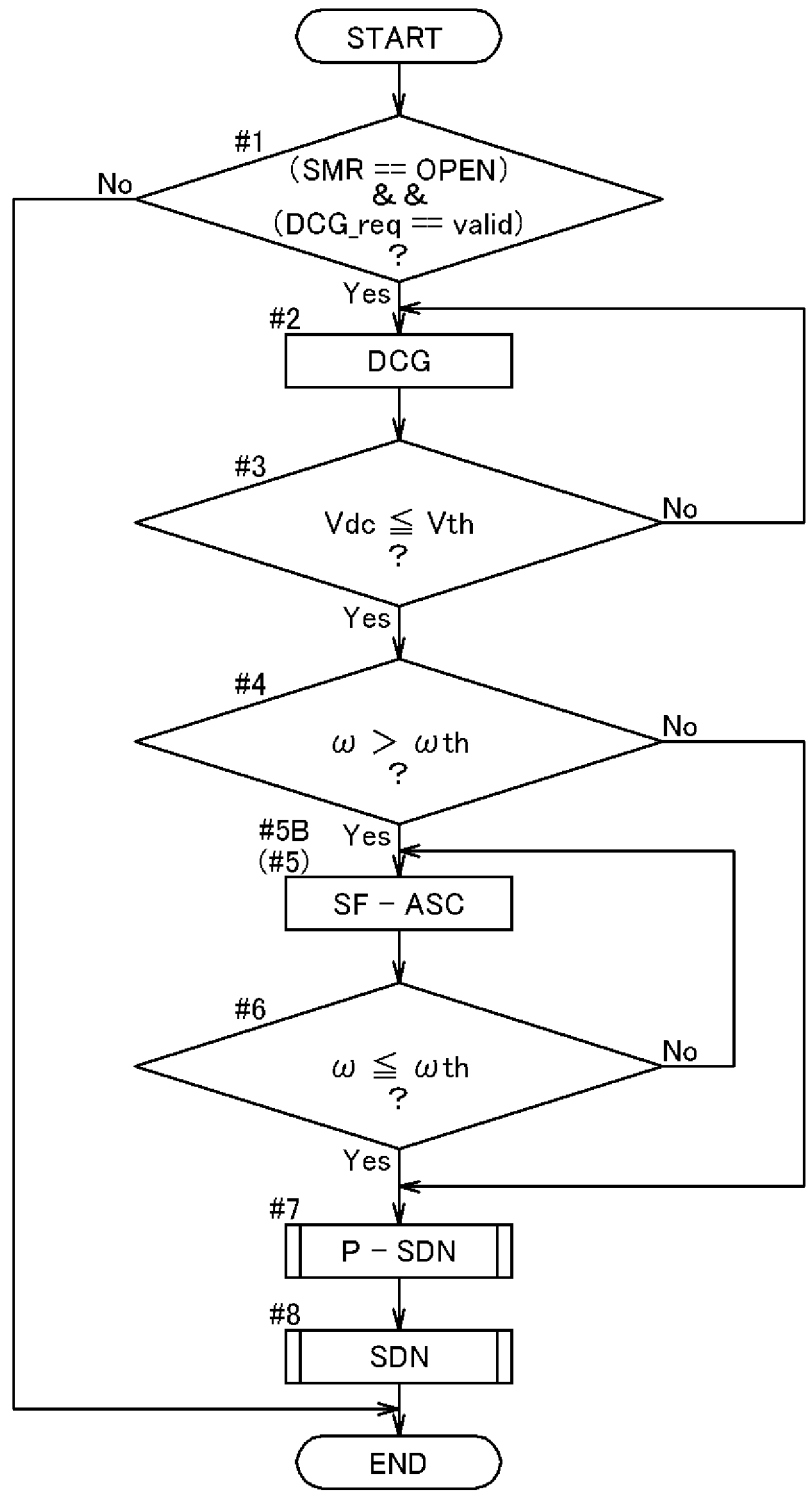
FIG. 17 is a flowchart showing another example of an inverter stop process.

When the contactors 9 (SMRs) are in an open state and a discharge control request (DCG_req) is valid, the inverter control device 20 performs an inverter stop process at step #2 to #9 shown in FIG. 17 (#1). When the contactors 9 (SMRs) are in an open state and a discharge control request (DCG_req) is valid, the inverter control device 20 performs discharge control (DCG) (#2). As described above with reference to FIG. 3, the discharge control continues until the direct-current link voltage Vdc reaches less than or equal to the defined voltage Vth (#3). Though illustration, etc., in the flowchart are omitted, as a matter of course, a determination of the direct-current link voltage Vdc is made before starting discharge control, and when the direct-current link voltage Vdc is less than or equal to the defined voltage Vth, without starting discharge control, processing may transition to the next process.

If the inverter control device 20 determines that the direct-current link voltage Vdc is less than or equal to the defined voltage Vth, then the inverter control device 20 determines whether the rotational speed ω of the rotating electrical machine 80 is higher than the defined rotational speed ωth (#4). When the rotational speed ω is less than or equal to the defined rotational speed ωth, even if the counter-electromotive voltage of the rotating electrical machine 80 is lower than the direct-current link voltage Vdc or higher than the direct-current link voltage Vdc, an increase in the direct-current link voltage Vdc is within an allowable range, and thus, the inverter control device 20 can perform shutdown control of the inverter 10. In the present embodiment, the inverter control device 20 performs partial shutdown control (P-SDN), followed by shutdown control (SDN), and thereby stops the inverter 10 (#7, #8, and #9).

If the inverter control device 20 determines at step #4 that the rotational speed co of the rotating electrical machine 80 is higher than the defined rotational speed ωth, the inverter control device 20 performs single-phase full active short circuit control (SF-ASC) which is described above with reference to FIGS. 15 and 16 (#5B). That is, if it is determined at step #4 that the rotational speed ω of the rotating electrical machine 80 is higher than the defined rotational speed ωth, full active short circuit control (F-ASC) is performed (#5). When current is allowed to flow back between the rotating electrical machine 80 and the inverter 10, breaking force acts on the rotating electrical machine 80. If the inverter control device 20 determines that the rotational speed ω of the rotating electrical machine 80 has reached less than or equal to the defined rotational speed ωth, the inverter control device 20 performs partial shutdown control (P-SDN) (#6 and #7).

Figure 18:
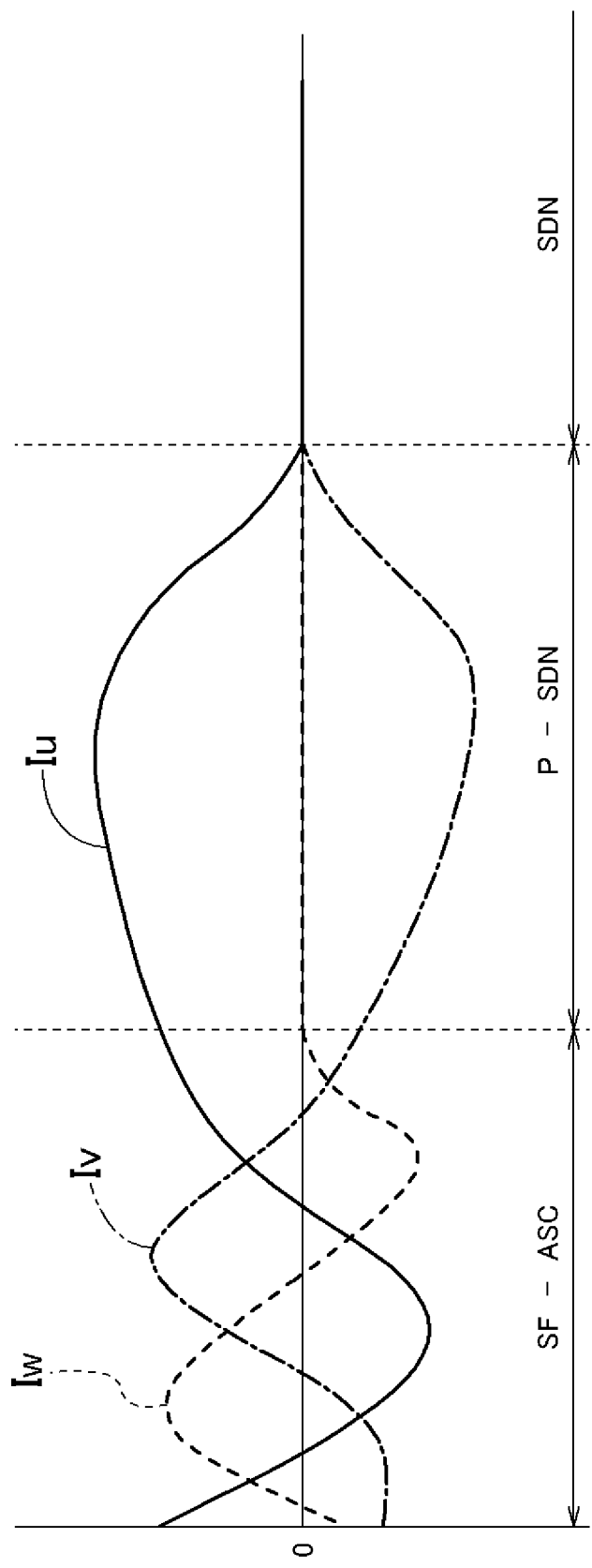
FIG. 18 is a waveform diagram showing another example of three-phase currents in the inverter stop process.

Note that as shown in FIGS. 12 and 18, a transition to partial shutdown control is made at a point in time when any one phase among three-phase alternating currents (Iu, Iv, and Iw) has reached zero (close to zero). That is, it is determined whether any one of the U-phase current Iu, the V-phase current Iv, and the W-phase current Iw is close to zero (#71), and if any one of them is zero, then switching elements 3 on both the upper and lower stages for the one phase with zero are controlled to an off state (#72: 1-phase OFF). Though not shown a step #72, one switching element 3 of an upper-stage-side switching element 31 and a lower-stage-side switching element 32 for each of the other two phases is controlled to an on state, and the other switching element 3 is controlled to an off state.

In the present embodiment, at a point in time when the W-phase current Iw has reached zero (close to zero), both the upper-stage-side switching element 31 and the lower-stage-side switching element 32 of the W-phase arm 3W are controlled to an off state. Note that it is a transition from a state of FIG. 15 to a state of FIG. 6, and thus, there is substantially no change in state. In the U-phase arm 3U which is the target phase for the single-phase full active short circuit control, of the upper-stage-side switching element 31 and the lower-stage-side switching element 32 which are both in an on state, either one of the switching elements 3 is controlled to an off state. In the V-phase arm 3V which is not the target phase for the single-phase full active short circuit control, of the upper-stage-side switching element 31 and the lower-stage-side switching element 32 which are both in an off state, either one of the switching elements 3 (a switching element 3 on a side on which the on state is maintained in the U-phase arm 3U) is controlled to an on state. In the present embodiment, as shown in FIGS. 15 and 6, the upper-stage-side switching element 31 of the U-phase arm 3U is controlled from an on state to an off state, and the lower-stage-side switching element 32 of the V-phase arm 3V is controlled from an off state to an on state.

In the partial shutdown control, a partial shutdown state is achieved by bringing at least one of the switching elements 3 included in the inverter 10 into an on state. In other words, by bringing switching elements 3 for one or more phases among the arms 3A for the plurality of phases (n phases: n is a natural number greater than or equal to 2) in the inverter 10 into an off state, one or more and less than n arms 3A are brought into a shutdown state. In the present embodiment, as shown in FIG. 6, the switching elements 3 on both the upper and lower stages of the W-phase arm 3W go into an off state, and the W-phase arm 3W goes into a shutdown state. In the U-phase arm 3U and the V-phase arm 3V, their upper-stage-side switching elements 31 go into an off state, and their lower-stage-side switching elements 32 go into an on state, going into a state in which active short circuit control is partially performed. That is, when taking a look at the U-phase and the V-phase, these phases are in a state of being subjected to lower-half partial active short circuit control.

Since the W-phase is in the shutdown state, as shown in FIG. 18, almost no current flows through the W-phase, and current flows through the U-phase and the V-phase in a distributed manner. Since alternating currents are balanced, the U-phase current Iu and the V-phase current Iv pass through an amplitude center (zero) at almost the same timing. In the present embodiment, the W-phase current Iw is already almost zero upon performing partial shutdown control, but the U-phase current Iu and the V-phase current Iv reach almost zero during the performance of the partial shutdown control, and at timing at which phase currents for all three phases have reached almost zero, the inverter control device 20 performs shutdown control (SDN) (#8).

As shown in FIGS. 13 and 18, a transition to shutdown control is made at a point in time when alternating currents (Iu, Iv, and Iw) for three phases all have reached zero (close to zero). That is, it is determined whether the U-phase current Iu, the V-phase current Iv, and the W-phase current Iw are all close to zero (#81), and when all are zero, all switching elements 3 are controlled to an off state (#82: 3-phase OFF). In the present embodiment, the W-phase current Iw is already zero (close to zero), and thus, when both the U-phase current Iu and the V-phase current Iv have reached zero (close to zero), a condition is satisfied, and the lower-stage-side switching elements 32 of the U-phase arm 3U and the V-phase arm 3V in the on state are controlled to an off state (a transition from a state of FIG. 6 to a state of FIG. 7 is made).

Note that the above description exemplifies a mode in which the inverter control device 20 performs partial shutdown control before performing shutdown control. However, it is not to impede a mode in which shutdown control is performed without performing partial shutdown control.

In addition, it is also possible to apply the configurations disclosed in the above description by combining them together as long as a contradiction does not arise. For other configurations, too, the embodiment disclosed in this specification is to be considered in all respects as merely illustrative. Therefore, various modifications can be made as appropriate without departing from the true spirit and scope of the present disclosure.

Summary of the Embodiment

A summary of an inverter control device (20) described in the above description will be briefly described below.

In an inverter control device (20) that controls an inverter (10) of a rotating electrical machine driving device (2) including the inverter (10) that is connected to a direct-current power supply (11) through contactors (9) and connected to an alternating-current rotating electrical machine (80) to convert electric power between direct current and alternating current of a plurality of phases; and a smoothing capacitor (4) that is disposed between the contactors (9) and the inverter (10) to smooth a direct-current link voltage (Vdc) which is a voltage on a direct-current side of the inverter (10), in one aspect, when the contactors (9) are in an open state and the rotating electrical machine (80) is in a rotating state, full active short circuit control is performed, the full active short circuit control bringing an upper-stage-side switching element (31) and a lower-stage-side switching element (32) for at least one phase among switching elements (3) for a plurality of phases in the inverter (10) into an on state to allow current to flow back between the rotating electrical machine (80) and the inverter (10).

In an open state of the contactors (9), energy of the stator coils (8) of the rotating electrical machine (80) cannot be regenerated in the direct-current power supply (11), and the smoothing capacitor (4) connected to the direct-current side of the inverter (10) is charged, which may increase the direct-current link voltage (Vdc). Hence, it is known to perform active short circuit control in which current is allowed to flow back between the rotating electrical machine (80) and the inverter (10) to inhibit the smoothing capacitor (4) from being charged. In general, in the active short circuit control in which current is allowed to flow back between the rotating electrical machine (80) and the inverter (10), the inverter (10) is controlled such that one side, all upper-stage-side switching elements (31) or all lower-stage-side switching elements (32) of the inverter (10), is brought into an on state and the other side is brought into an off state. That is, flow-back current flows through only either one of the upper-stage-side switching elements (31) and the lower-stage-side switching elements (32). According to this configuration, flow-back current flows through both of an upper-stage-side switching element (31) and a lower-stage-side switching element (32) for at least one phase. For other phases, in general, in the inverter (10), flow-back current flows by passing through a freewheeling diode (5) connected in parallel to a switching element (3). The flow-back current flowing through each phase is equal to that for a case of general active short circuit control. For the phase in which flow-back current flows through both the upper-stage-side switching element (31) and the lower-stage-side switching element (32), the flow-back current flows through the upper-stage-side switching element (31) and the lower-stage-side switching element (32) in a distributed manner, and thus, the current flowing through each switching element (3) decreases, suppressing an increase in temperature. Therefore, according to this configuration, when the contactors (9) are in an open state and the rotating electrical machine (80) is in a rotating state, the inverter (10) can be controlled so as to appropriately stop the operation of the inverter (10).

Here, it is preferred that the inverter control device (20) perform, as the full active short circuit control, single-phase full active short circuit control that brings an upper-stage-side switching element and a lower-stage-side switching element for any one phase among switching elements for a plurality of phases in the inverter into an on state to allow current to flow back between the rotating electrical machine and the inverter.

According to this configuration, flow-back current flows through both of an upper-stage-side switching element (31) and a lower-stage-side switching element (32) for any one phase. For other phases, in general, in the inverter (10), flow-back current flows by passing through a freewheeling diode (5) connected in parallel to a switching element (3). The flow-back current flowing through each phase is equal to that for a case of general active short circuit control. For the phase in which flow-back current flows through both the upper-stage-side switching element (31) and the lower-stage-side switching element (32), the flow-back current flows through the upper-stage-side switching element (31) and the lower-stage-side switching element (32) in a distributed manner, and thus, the current flowing through each switching element (3) decreases, suppressing an increase in temperature.

Here, it is preferred that the inverter control device (20) allow a phase to be subjected to the full active short circuit control to transition from one to another.

In general, a freewheeling diode 5 is connected in parallel to a switching element (3), with a direction going from the direct-current negative polarity to positive polarity being a forward direction. Hence, in other phases than a phase that is controlled to an on state, too, current in the forward direction of the freewheeling diode (5) flows. However, since current does not flow through a switching element (3) in an off state, a burden placed on switching elements (3) is limited to at least one phase (target phase) which is subjected to full active short circuit control among the plurality of phases. By allowing the target phase to transition from one to another, a burden can be distributed between the switching elements (3) for the respective phases. Particularly, when single-phase full active short circuit control is performed, there is a possibility that load bias becomes remarkable. Therefore, particularly when single-phase full active short circuit control is performed, it is preferred that the inverter control device (20) allow a phase to be subjected to single-phase full active short circuit control to transition from one to another.

In addition, it is preferred that the inverter control device (20) perform, as the full active short circuit control, all-phase full active short circuit control that brings all switching elements (3) of the inverter (10) into an on state to allow current to flow back between the rotating electrical machine (80) and the inverter (10).

According to this configuration, since all switching elements (3) of the inverter (10) are controlled to an on state, flow-back current flows through both the upper-stage-side switching elements (31) and the lower-stage-side switching elements (32). That is, since flow-back current flows through the upper-stage-side switching elements (31) and the lower-stage-side switching elements (32) in a distributed manner, current flowing through each switching element (3) decreases, suppressing an increase in temperature.

Here, it is preferred that the inverter control device (20) perform the full active short circuit control after performing discharge control that discharges the smoothing capacitor (4).

When all switching elements (3) of the inverter (10) are brought into an on state, the arms (3A) of the inverter (10) go into a short-circuit state between the direct-current positive polarity side and negative polarity side. When the direct-current link voltage (Vdc) is high, there is a possibility that large current flows for a long period of time. When the direct-current link voltage (Vdc) is low, even if large current momentarily flows, a duration is short. Therefore, it is preferred to reduce the direct-current link voltage (Vdc) before performing full active short circuit control. Since the direct-current link voltage (Vdc) corresponds to a voltage between the terminals of the smoothing capacitor (4), by discharging the smoothing capacitor (4), the direct-current link voltage (Vdc) can be reduced.

In addition, it is preferred that the inverter control device (20) perform the full active short circuit control when the direct-current link voltage (Vdc) is less than or equal to a defined voltage (Vth) defined in advance.

As described above, when the direct-current link voltage (Vdc) is high, there is a possibility that large current flows for a long period of time. Thus, it is not desirable that the direct-current link voltage (Vdc) be high upon performing full active short circuit control. Hence, it is desirable to restrict the performance of full active short circuit control depending on the magnitude of the direct-current link voltage (Vdc).

In addition, it is preferred that the inverter control device (20) perform shutdown control when a rotational speed ($\omega$) of the rotating electrical machine (80) has reached less than or equal to a defined rotational speed ($\omega$th) defined in advance, after starting the full active short circuit control, the shutdown control bringing all of the switching elements (3) of the inverter (10) into an off state.

The counter-electromotive voltage of the rotating electrical machine (80) increases as the rotational speed (w) of the rotating electrical machine (80) increases. When the counter-electromotive voltage is high, the smoothing capacitor (4) is charged, increasing the direct-current link voltage (Vdc). Therefore, when the inverter (10) is stopped by performing shutdown control after starting full active short circuit control, it is preferred to set a limit based on the rotational speed (w) of the rotating electrical machine (80).

Here, it is preferred that the inverter control device (20) perform partial shutdown control before performing the shutdown control, the partial shutdown control achieving a partial shutdown state by bringing at least one of the switching elements (3) into an on state.

When all switching elements (3) of the inverter (10) are controlled to an off state all at one point in time, there is a possibility that energy of the stator coils (8) of the rotating electrical machine (80) is supplied to the smoothing capacitor (4) in a short period of time, transiently increasing the direct-current link voltage (Vdc). Since some switching elements (3) are in an on state, the magnitude of a transient current flowing into the smoothing capacitor (4) when other switching elements (3) are controlled to an off state can be suppressed. That is, by performing partial shutdown control, followed by shutdown control, the flowing of a transient current into the smoothing capacitor (4) and the generation of a transient voltage are reduced, enabling to smoothly stop the inverter (10).

The invention claimed is:

1. An inverter control device comprising:
an inverter that is connected to a direct-current power supply through contactors and connected to an alternating-current rotating electrical machine to convert electric power between direct current and alternating current of a plurality of phases;
a smoothing capacitor that is disposed between the contactors and the inverter to smooth a direct-current link voltage, the direct-current link voltage being a voltage on a direct-current side of the inverter; and
an electronic control unit that is configured to perform full active short circuit control when the contactors are in an open state and the rotating electrical machine is in a rotating state, the full active short circuit control bringing an upper-stage-side switching element and a lower-stage-side switching element for at least one phase among switching elements for a plurality of phases in the inverter into an on state to allow current to flow back between the rotating electrical machine and the inverter.

2. The inverter control device according to claim 1, wherein as the full active short circuit control, the electronic control unit performs single-phase full active short circuit control, the single-phase full active short circuit control bringing an upper-stage-side switching element and a lower-stage-side switching element for any one phase among switching elements for a plurality of phases in the inverter into an on state to allow current to flow back between the rotating electrical machine and the inverter.

3. The inverter control device according to claim 2, wherein a phase to be subjected to the full active short circuit control transitions from one phase to anther phase.

4. The inverter control device according to claim 1, wherein as the full active short circuit control, the electronic control unit performs all-phase full active short circuit control, the all-phase full active short circuit control bringing all switching elements of the inverter into an on state to allow current to flow back between the rotating electrical machine and the inverter.

5. The inverter control device according to claim 3, wherein the electronic control unit performs the full active short circuit control after performing discharge control that discharges the smoothing capacitor.

6. The inverter control device according to claim 5, wherein the electronic control unit performs the full active short circuit control when the direct-current link voltage is less than or equal to a defined voltage defined in advance.

7. The inverter control device according to claim 6, wherein when a rotational speed of the rotating electrical machine has reached less than or equal to a defined rotational speed defined in advance after starting the full active short circuit control, the electronic control unit performs shutdown control, and the shutdown control bringing all of the switching elements of the inverter into an off state.

8. The inverter control device according to claim 7, wherein the electronic control unit performs partial shutdown control before performing the shutdown control, the partial shutdown control achieving a partial shutdown state by bringing at least one of the switching elements into an on state.

9. The inverter control device according to claim 1, wherein a phase to be subjected to the full active short circuit control transitions from one phase to another phase.

10. The inverter control device according to claim 1, wherein the electronic control unit performs the full active short circuit control after performing discharge control that discharges the smoothing capacitor.

11. The inverter control device according to claim 1, wherein the electronic control unit performs the full active short circuit control when the direct-current link voltage is less than or equal to a defined voltage defined in advance.

12. The inverter control device according to claim 1, wherein when a rotational speed of the rotating electrical machine has reached less than or equal to a defined rotational speed defined in advance after starting the full active short circuit control, the electronic control unit performs shutdown control, and the shutdown control bringing all of the switching elements of the inverter into an off state.

13. The inverter control device according to claim 12, wherein the electronic control unit performs partial shutdown control before performing the shutdown control, the partial shutdown control achieving a partial shutdown state by bringing at least one of the switching elements into an on state.

14. The inverter control device according to claim 2, wherein the electronic control unit performs the full active short circuit control after performing discharge control that discharges the smoothing capacitor.

15. The inverter control device according to claim 2, wherein the electronic control unit performs the full active short circuit control when the direct-current link voltage is less than or equal to a defined voltage defined in advance.

16. The inverter control device according to claim 15, wherein when a rotational speed of the rotating electrical machine has reached less than or equal to a defined rotational speed defined in advance after starting the full active short circuit control, the electronic control unit performs shutdown control, and the shutdown control bringing all of the switching elements of the inverter into an off state.

17. The inverter control device according to claim 16, wherein the electronic control unit performs partial shutdown control before performing the shutdown control, the partial shutdown control achieving a partial shutdown state by bringing at least one of the switching elements into an on state.

18. The inverter control device according to claim 9, wherein the electronic control unit performs the full active short circuit control after performing discharge control that discharges the smoothing capacitor.

19. The inverter control device according to claim 9, wherein the electronic control unit performs the full active short circuit control when the direct-current link voltage is less than or equal to a defined voltage defined in advance.

20. The inverter control device according to claim 9, wherein when a rotational speed of the rotating electrical machine has reached less than or equal to a defined rotational speed defined in advance after starting the full active short circuit control, the electronic control unit performs shutdown control, and the shutdown control bringing all of the switching elements of the inverter into an off state.

* * * * *